United States Patent
Collinge et al.

(10) Patent No.: US 12,495,020 B2
(45) Date of Patent: Dec. 9, 2025

(54) COMMUNICATION OF SENSITIVE DATA IN RESTRICTED DATA CHANNEL

(71) Applicant: Mastercard International Incorporated, New York, NY (US)

(72) Inventors: Mehdi Collinge, Hainaut (BE); Omar Laazimani, London (GB); Alan Johnson, Maldon (GB)

(73) Assignee: Mastercard International Incorporated, Purchase, NY (US)

( * ) Notice: Subject to any disclaimer, the term of this patent is extended or adjusted under 35 U.S.C. 154(b) by 452 days.

(21) Appl. No.: 17/802,515

(22) PCT Filed: Feb. 17, 2021

(86) PCT No.: PCT/US2021/018344
§ 371 (c)(1),
(2) Date: Aug. 25, 2022

(87) PCT Pub. No.: WO2021/173396
PCT Pub. Date: Sep. 2, 2021

(65) Prior Publication Data
US 2023/0164122 A1    May 25, 2023

(30) Foreign Application Priority Data
Feb. 26, 2020   (EP) .................................... 20159634

(51) Int. Cl.
*H04L 9/40*   (2022.01)
*H04L 9/08*   (2006.01)

(52) U.S. Cl.
CPC ........ *H04L 63/0428* (2013.01); *H04L 9/0819* (2013.01)

(58) Field of Classification Search
CPC ............................ H04L 63/0428; H04L 9/0819
See application file for complete search history.

(56) References Cited

U.S. PATENT DOCUMENTS

| | | | |
|---|---|---|---|
| 6,000,832 A | 12/1999 | Franklin | |
| 6,038,549 A * | 3/2000 | Davis .................. | G06Q 20/327 713/172 |

(Continued)

FOREIGN PATENT DOCUMENTS

| | | |
|---|---|---|
| CN | 101192295 A | 6/2008 |
| DE | 102011085537 A1 | 5/2013 |

(Continued)

OTHER PUBLICATIONS

Extended European Search Report dated Jul. 30, 2020, pp. 1-8.

(Continued)

*Primary Examiner* — Harris C Wang
(74) *Attorney, Agent, or Firm* — Pramudji Law Group PLLC; Ari Pramudji

(57) ABSTRACT

Communication of information relating to an event is described, where the information is contained in a data field. Methods of communicating and obtaining the information are described, together with suitable apparatus for performing these methods. One or more elements of information relating to the event are obtained and used to determine a cryptographic record of the event. A first set of places in the data field are filled by a combination of some or all of each of the elements together with time information associated with the event. The cryptographic record is used to fill a second set of places in the data record. On reception of a message including the data field, the data field can be resolved into the first set of places and the second set of places. The time information associated with the event can then be determined and used to establish the whole or partial elements of information that were combined with the time information to fill the first set of places. Whole elements of information are then established from any partial elements. When these elements are all established, they can be used to calculate cryptographic record data which can be matched (Continued)

against the cryptographic record from the second set of places in the data field to determine that the elements of information are correct.

21 Claims, 24 Drawing Sheets

(56) References Cited

U.S. PATENT DOCUMENTS

| | | | |
|---|---|---|---|
| 6,314,519 B1* | 11/2001 | Davis | G06Q 20/3821 |
| | | | 380/278 |
| 6,327,578 B1 | 12/2001 | Linehan | |
| 6,434,238 B1 | 8/2002 | Chaum et al. | |
| 7,027,773 B1 | 4/2006 | McMillin | |
| 7,357,309 B2 | 4/2008 | Ghosh | |
| 7,657,748 B2 | 2/2010 | Gentry | |
| 8,720,771 B2 | 5/2014 | MacKinnon | |
| 9,195,984 B1 | 11/2015 | Spector | |
| 9,240,986 B1* | 1/2016 | Ackerman | H04L 63/0838 |
| 9,262,651 B2 | 2/2016 | Paulsen | |
| 9,595,030 B2 | 3/2017 | Ekselius | |
| 9,674,892 B1* | 6/2017 | Li | H04L 63/123 |
| 9,741,036 B1 | 8/2017 | Grassadonia | |
| 9,774,401 B1 | 9/2017 | Borrill | |
| 10,496,856 B2 | 12/2019 | Palermo | |
| RE47,894 E | 3/2020 | Wang | |
| 10,706,400 B1 | 7/2020 | Puffer et al. | |
| 10,902,423 B2 | 1/2021 | Radu et al. | |
| 10,963,871 B2 | 3/2021 | Safak et al. | |
| 11,074,564 B2 | 7/2021 | Gurunathan et al. | |
| 11,080,697 B2 | 8/2021 | Lakka et al. | |
| 11,080,713 B2 | 8/2021 | Kohli | |
| 11,093,938 B2 | 8/2021 | Parekh | |
| 11,107,078 B2 | 8/2021 | Mariappan et al. | |
| 11,157,896 B2 | 10/2021 | Nwokolo et al. | |
| 11,301,865 B2 | 4/2022 | Tang | |
| 11,468,187 B2* | 10/2022 | Iyer | H04L 9/0891 |
| 11,544,781 B2 | 1/2023 | Dogin | |
| 11,941,591 B2* | 3/2024 | Faith | G06Q 20/3821 |
| 2004/0019571 A1 | 1/2004 | Hurwitz | |
| 2006/0049258 A1 | 3/2006 | Piikivi | |
| 2006/0219776 A1 | 10/2006 | Finn | |
| 2006/0283960 A1 | 12/2006 | Top | |
| 2007/0022058 A1 | 1/2007 | Labrou et al. | |
| 2007/0125840 A1 | 6/2007 | Law et al. | |
| 2008/0048036 A1 | 2/2008 | Matsumoto et al. | |
| 2008/0065555 A1* | 3/2008 | Mullen | G06Q 20/3674 |
| | | | 705/41 |
| 2008/0071681 A1* | 3/2008 | Khalid | G06Q 20/105 |
| | | | 235/494 |
| 2008/0208746 A1 | 8/2008 | Royyuru | |
| 2009/0048971 A1 | 2/2009 | Hathaway et al. | |
| 2009/0104888 A1 | 4/2009 | Cox | |
| 2010/0033299 A1 | 2/2010 | Davis | |
| 2010/0108758 A1* | 5/2010 | Smets | G06Q 20/346 |
| | | | 235/380 |
| 2011/0022521 A1 | 1/2011 | Collinge et al. | |
| 2011/0184867 A1 | 7/2011 | Varadarajan | |
| 2011/0215159 A1 | 9/2011 | Jain | |
| 2011/0238573 A1 | 9/2011 | Varadarajan | |
| 2011/0264580 A1* | 10/2011 | Smets | G06Q 20/327 |
| | | | 705/39 |
| 2012/0036360 A1 | 2/2012 | Bassu et al. | |
| 2012/0116902 A1 | 5/2012 | Cardina et al. | |
| 2013/0212007 A1 | 8/2013 | Mattsson | |
| 2013/0212025 A1* | 8/2013 | Tanner | G06Q 20/401 |
| | | | 705/44 |
| 2013/0262296 A1 | 10/2013 | Thomas et al. | |
| 2013/0297508 A1 | 11/2013 | Belamant | |
| 2014/0040139 A1 | 2/2014 | Brudnicki | |
| 2014/0061302 A1 | 3/2014 | Hammad | |
| 2014/0138435 A1 | 5/2014 | Khalid | |
| 2014/0189359 A1 | 7/2014 | Marien | |
| 2014/0191031 A1 | 7/2014 | Paulsen | |
| 2014/0258135 A1 | 9/2014 | Park | |
| 2014/0279556 A1 | 9/2014 | Priebatsch et al. | |
| 2014/0358777 A1 | 12/2014 | Gueh | |
| 2015/0032627 A1 | 1/2015 | Dill et al. | |
| 2015/0032636 A1 | 1/2015 | Wedekind | |
| 2015/0046339 A1 | 2/2015 | Wong | |
| 2015/0112870 A1 | 4/2015 | Nagasundaram et al. | |
| 2015/0137949 A1 | 5/2015 | Rofougaran et al. | |
| 2015/0142673 A1 | 5/2015 | Nelsen et al. | |
| 2015/0262180 A1 | 9/2015 | Hambleton | |
| 2015/0269566 A1 | 9/2015 | Gaddam et al. | |
| 2015/0294305 A1 | 10/2015 | Wang | |
| 2015/0302390 A1 | 10/2015 | Huxham et al. | |
| 2015/0310425 A1 | 10/2015 | Cacioppo | |
| 2016/0065370 A1 | 3/2016 | Le Saint | |
| 2016/0071095 A1 | 3/2016 | Foerster et al. | |
| 2016/0117715 A1 | 4/2016 | Gross et al. | |
| 2016/0217467 A1 | 7/2016 | Smets et al. | |
| 2016/0224971 A1 | 8/2016 | Aabye | |
| 2016/0307186 A1 | 10/2016 | Noe | |
| 2017/0091758 A1 | 3/2017 | Kim et al. | |
| 2017/0116605 A1* | 4/2017 | Unser | G06Q 20/405 |
| 2017/0178090 A1 | 6/2017 | Sarin | |
| 2017/0330181 A1 | 11/2017 | Ortiz | |
| 2017/0330184 A1 | 11/2017 | Sabt | |
| 2017/0344974 A1 | 11/2017 | Britt | |
| 2018/0005231 A1 | 1/2018 | Grassadonia et al. | |
| 2018/0047016 A1 | 2/2018 | Sarin | |
| 2018/0232734 A1 | 8/2018 | Smets et al. | |
| 2018/0349907 A1 | 12/2018 | Dixon | |
| 2019/0026716 A1 | 1/2019 | Anbukkarasu | |
| 2019/0034929 A1 | 1/2019 | Tang et al. | |
| 2019/0066097 A1 | 2/2019 | Mackie | |
| 2019/0075094 A1 | 3/2019 | Clarke | |
| 2019/0108462 A1 | 4/2019 | Deloo | |
| 2019/0147449 A1* | 5/2019 | Cole | G06Q 20/202 |
| | | | 705/44 |
| 2019/0188696 A1 | 6/2019 | Carpenter et al. | |
| 2019/0196935 A1 | 6/2019 | Edwards | |
| 2019/0205575 A1 | 7/2019 | Gardiner et al. | |
| 2019/0213585 A1 | 7/2019 | Patni | |
| 2019/0228408 A1 | 7/2019 | Sing | |
| 2019/0253434 A1 | 8/2019 | Biyani et al. | |
| 2019/0318345 A1 | 10/2019 | Kallugudde | |
| 2019/0362339 A1 | 11/2019 | Gurunathan et al. | |
| 2019/0370790 A1 | 12/2019 | Spector | |
| 2019/0392411 A1 | 12/2019 | Jain et al. | |
| 2020/0009454 A1 | 1/2020 | Kaiho et al. | |
| 2020/0019961 A1 | 1/2020 | Silvestre | |
| 2020/0027086 A1 | 1/2020 | Rao et al. | |
| 2020/0160325 A1 | 5/2020 | Kim et al. | |
| 2020/0219090 A1 | 7/2020 | Zarakas et al. | |
| 2020/0265420 A1 | 8/2020 | Hamdan et al. | |
| 2020/0302441 A1 | 9/2020 | Collinge et al. | |
| 2020/0410483 A1 | 12/2020 | Dill et al. | |
| 2021/0012322 A1 | 1/2021 | Manchanda | |
| 2021/0065156 A1 | 3/2021 | Kadiwala et al. | |
| 2021/0176060 A1 | 6/2021 | Kallugudde | |
| 2021/0217005 A1 | 7/2021 | Mehrhoff et al. | |
| 2021/0287211 A1 | 9/2021 | Aabye et al. | |
| 2022/0122081 A1 | 4/2022 | Wagner et al. | |
| 2023/0164122 A1* | 5/2023 | Collinge | H04L 9/088 |
| | | | 713/171 |

FOREIGN PATENT DOCUMENTS

| | | |
|---|---|---|
| EP | 0919945 A2 | 6/1999 |
| EP | 2189934 A2 | 5/2010 |
| EP | 2390817 A | 11/2011 |
| EP | 3618403 A1 | 3/2020 |
| JP | 2008129890 A | 6/2008 |
| JP | 2008-204248 A | 9/2008 |
| KR | 10-2014-0008668 A | 1/2014 |
| KR | 101502460 B1 | 3/2015 |
| KR | 101679783 B1 | 11/2016 |
| KR | 2016-0140216 A | 12/2016 |
| KR | 20170058903 A | 5/2017 |
| WO | 1997046964 A1 | 12/1997 |
| WO | 2001-099070 A2 | 12/2001 |

(56) References Cited

FOREIGN PATENT DOCUMENTS

| WO | 2003-038719 | A1 | 5/2003 |
|---|---|---|---|
| WO | 2008-059465 | A2 | 5/2008 |
| WO | 2010-070539 | A1 | 6/2010 |
| WO | 2010-099352 | A1 | 9/2010 |
| WO | 2013-050296 | A1 | 4/2013 |
| WO | 2013155627 | A1 | 10/2013 |
| WO | 2016-123309 | A1 | 8/2016 |
| WO | 2016-161000 | A1 | 10/2016 |
| WO | 2017007935 | A1 | 1/2017 |
| WO | 2018-031856 | A1 | 2/2018 |
| WO | 2019-136044 | A1 | 7/2019 |
| WO | 2019-161003 | A1 | 8/2019 |
| WO | 2020-243286 | A | 12/2020 |

OTHER PUBLICATIONS

PCT International Search Report, Application No. PCT/GB2017/051818, dated Sep. 1, 2017, 2 pp.
EP Communication pursuant to Article 94 (3) EPC; 19184252.5; Aug. 25, 2022, pp. 1-7.
EP 19187159.9 European Summons to attend oral proceedings pursuant to Rule 155 (1) dated Jul. 29, 2022, pp. 1-10.
PCT International Search Report and Written Opinion; PCT/US2020-039521; Oct. 14, 2020.
EPO Office Action; EP 19187159.9; Jun. 8, 2021.
EPO Search Report; EP 19187159.9; Apr. 1, 20207.
Yingjiu, et al.; A Security-Enhanced One-Time Payment Scheme for Credit Card; 14th International Workshop on Research Issues on Data Engineering; Web Services for E-Commerce and E-Government Applications (RIDE'04); IEEE; 2004.
EMV MasterCard Contactless Transaction Flow, EMV Level 2 Kernels, https://www.level2kernel.com/emv-mastercard-contactless-transaction.html, 2021, pp. 1-3.
EMV Overview—Elavon Developer Portal, https://developer.elavon.com/na/docs/Viaconex/1.0.0/emv-integration-guide/3_emv_overview, 2022, pp. 1-33.
EMV, https://en.wikipedia.org/wiki/EMV, Wikipedia, Jan. 18, 2022 (last edited), pp. 1-26.
Tokenization (data security), https://en.wikipedia.org/wiki/Tokenization_(data_security), Wikipedia, Jan. 8, 2022 (last edited), pp. 1-8.
EMV Integrated Circuit Card Specifications for Payment Systems, Book 4 Cardholder, Attendant, and Acquirer Interface Requirements, Nov. 2011, pp. 1-154, EMC Version 4.3 Book 4.
A Guide to EMV Chip Technology, Nov. 2014, pp. 1-36, Version 2.0, EMVCo, LLC.
Field 55: ICC Data, Elavon Developer Portal, https://developer-eu.elavon.com/docs/eisop/field-descriptions/field-55-icc-data, 2021, pp. 1-11.
Terminal verification results, https://en.wikipedia.org/wiki/Terminal_verification_results, Wikipedia, Dec. 12, 2021 (last edited), pp. 1-3.
Smart card application protocol data unit, https://en.wikipedia.org/wiki/Smart_card_application_protocol_data_unit, Wikipedia, Aug. 24, 2021 (last edited), pp. 1-3.
O. Ogundele, et al.; "The Implementation of a Full EMV Smartcard for a Point-of-Sale Transaction," World Congress on Internet Security (WorldCIS-2012), Guelph, ON, Canada, 2012, pp. 28-35.
EMVco Payment Account Reference (PAR): A Primer, Version 1.1, Secure Technology Alliance, Apr. 30, 2018, pp. 1-20.
PCT/SG2022/050327 Search Report and Written Opinion dated Dec. 23, 2022, pp. 1-20.
PCT/US2022/049771 International Search Report and Written Opinion dated Mar. 20, 2023, pp. 1-19.
PCT/US2020/040206I nternational Search Report and Written Opinion dated Oct. 21, 2020.
PCT/US2021/018344 International Search Report and Written Opinion dated May 27, 2021, pp. 1-11.
EP 20159634.3 Extended European Search Report dated Jul. 30, 2020, pp. 1-8.
PCT/US2021/042321 International Search Report and Written Opinion dated Nov. 11, 2021, pp. 1-11.
GB 2012833.6 Search Report dated Jan. 27, 2021, pp. 1-2.
PCT International Search Report and Written Opinion; PCT/US2021/047077; Dec. 14, 2021.
EP Search Report; EP 21858781.4; Jul. 12, 2024.
SG10202204968V Written Opinion dated Jan. 23, 2025, pp. 1-26.

* cited by examiner

| | 6 bits | 6 bits | 7 bits | 8 bits | 8 bits | 9 bits |
|---|---|---|---|---|---|---|
| date AND TIME 05/02/2018 10:17:00 PM | Max Number of months | 63 months | 63 months | 127 months | 255 months | 255 months | 511 months |
| Number of months 7 | | | | | | | |
| Next month (yy/mm) 1806 | | | | | | | |
| Dynamic Expiry Date 1901 | Dynamic Expiry Date | 2309 | 2309 | 2901 | | | |
| | #bits ATC | 3 bits | 2 bits | 3 bits | | 4 bits | 4 bits |
| | #bits UN | 3 bits | 4 bits | 4 bits | | 4 bits | 5 bits |
| | Safe #years = 5 | 5.3 years | 5.3 years | 10.6 years | 21.3 years | 21.3 years | 42.6 years |
| | #years (Japan) = 7 | | | | | | |

Any # above is at serious risk (PSP + Expiry Date Validation by APIs)

Figure 6

| G | V | G | V | G | | V | | | G | V | G | V | G | | V | | |
|---|---|---|---|---|---|---|---|---|---|---|---|---|---|---|---|---|---|---|
| | | | | KR | RF | N | KR | RF | N | | | | | KR | RF | N | KR | RF | N |
| 0 | | | | | | | | | | 0 | | | | | | | | | |
| 1 | 0 | 000001 | 000000 | 0 | 0 | 1 | 0 | 0 | 0 | 1 | 0 | 000001 | 000000 | 0 | 0 | 1 | 0 | 0 | 0 |
| 2 | 1 | 000010 | 000001 | 0 | 0 | 2 | 0 | 0 | 1 | 17 | 16 | 010001 | 010000 | 0 | 1 | 1 | 0 | 1 | 0 |
| 3 | 2 | 000011 | 000010 | 0 | 0 | 3 | 0 | 0 | 2 | 33 | 32 | 100001 | 100000 | 1 | 0 | 1 | 1 | 0 | 0 |
| 4 | 3 | 000100 | 000011 | 0 | 0 | 4 | 0 | 0 | 3 | 49 | 48 | 110001 | 110000 | 1 | 1 | 1 | 1 | 1 | 0 |
| 5 | 4 | 000101 | 000100 | 0 | 0 | 5 | 0 | 0 | 4 | 2 | 1 | 000010 | 000001 | 0 | 0 | 2 | 0 | 0 | 1 |
| 6 | 5 | 000110 | 000101 | 0 | 0 | 6 | 0 | 0 | 5 | 18 | 17 | 010010 | 010001 | 0 | 1 | 2 | 0 | 1 | 1 |
| 7 | 6 | 000111 | 000110 | 0 | 0 | 7 | 0 | 0 | 6 | 34 | 33 | 100010 | 100001 | 1 | 0 | 2 | 1 | 0 | 1 |
| 8 | 7 | 001000 | 000111 | 0 | 0 | 8 | 0 | 0 | 7 | 50 | 49 | 110010 | 110001 | 1 | 1 | 2 | 1 | 1 | 1 |
| 9 | 8 | 001001 | 001000 | 0 | 0 | 9 | 0 | 0 | 8 | 3 | 2 | 000011 | 000010 | 0 | 0 | 3 | 0 | 0 | 2 |
| 10 | 9 | 001010 | 001001 | 0 | 0 | 10 | 0 | 0 | 9 | 19 | 18 | 010011 | 010010 | 0 | 1 | 3 | 0 | 1 | 2 |
| 11 | 10 | 001011 | 001010 | 0 | 0 | 11 | 0 | 0 | 10 | 35 | 34 | 100011 | 100010 | 1 | 0 | 3 | 1 | 0 | 2 |
| 12 | 11 | 001100 | 001011 | 0 | 0 | 12 | 0 | 0 | 11 | 51 | 50 | 110011 | 110010 | 1 | 1 | 3 | 1 | 1 | 2 |
| 13 | 12 | 001101 | 001100 | 0 | 0 | 13 | 0 | 0 | 12 | 4 | 3 | 000100 | 000011 | 0 | 0 | 4 | 0 | 0 | 3 |
| 47 | 46 | 101111 | 101110 | 1 | 0 | 15 | 1 | 0 | 14 | 44 | 43 | 101100 | 101011 | 1 | 0 | 12 | 1 | 0 | 11 |
| 48 | 47 | 110000 | 101111 | 1 | 1 | 0 | 1 | 0 | 15 | 60 | 59 | 111100 | 111011 | 1 | 1 | 12 | 1 | 1 | 11 |
| 49 | 48 | 110001 | 110000 | 1 | 1 | 1 | 1 | 1 | 0 | 13 | 12 | 001101 | 001100 | 0 | 0 | 13 | 0 | 0 | 12 |
| 50 | 49 | 110010 | 110001 | 1 | 1 | 2 | 1 | 1 | 1 | 29 | 28 | 011101 | 011100 | 0 | 1 | 13 | 0 | 1 | 12 |
| 51 | 50 | 110011 | 110010 | 1 | 1 | 3 | 1 | 1 | 2 | 45 | 44 | 101101 | 101100 | 1 | 0 | 13 | 1 | 0 | 12 |
| 52 | 51 | 110100 | 110011 | 1 | 1 | 4 | 1 | 1 | 3 | 61 | 60 | 111101 | 111100 | 1 | 1 | 13 | 1 | 1 | 12 |
| 53 | 52 | 110101 | 110100 | 1 | 1 | 5 | 1 | 1 | 4 | 14 | 13 | 001110 | 001101 | 0 | 0 | 14 | 0 | 0 | 13 |
| 54 | 53 | 110110 | 110101 | 1 | 1 | 6 | 1 | 1 | 5 | 30 | 29 | 011110 | 011101 | 0 | 1 | 14 | 0 | 1 | 13 |
| 55 | 54 | 110111 | 110110 | 1 | 1 | 7 | 1 | 1 | 6 | 46 | 45 | 101110 | 101101 | 1 | 0 | 14 | 1 | 0 | 13 |
| 56 | 55 | 111000 | 110111 | 1 | 1 | 8 | 1 | 1 | 7 | 62 | 61 | 111110 | 111101 | 1 | 1 | 14 | 1 | 1 | 13 |
| 57 | 56 | 111001 | 111000 | 1 | 1 | 9 | 1 | 1 | 8 | 15 | 14 | 001111 | 001110 | 0 | 0 | 15 | 0 | 0 | 14 |
| 58 | 57 | 111010 | 111001 | 1 | 1 | 10 | 1 | 1 | 9 | 31 | 30 | 011111 | 011110 | 0 | 1 | 15 | 0 | 1 | 14 |
| 59 | 58 | 111011 | 111010 | 1 | 1 | 11 | 1 | 1 | 10 | 47 | 46 | 101111 | 101110 | 1 | 0 | 15 | 1 | 0 | 14 |
| 60 | 59 | 111100 | 111011 | 1 | 1 | 12 | 1 | 1 | 11 | 63 | 62 | 111111 | 111110 | 1 | 1 | 15 | 1 | 1 | 14 |
| 61 | 60 | 111101 | 111100 | 1 | 1 | 13 | 1 | 1 | 12 | 16 | 15 | 010000 | 001111 | 0 | 1 | 0 | 0 | 0 | 15 |
| 62 | 61 | 111110 | 111101 | 1 | 1 | 14 | 1 | 1 | 13 | 32 | 31 | 100000 | 011111 | 1 | 0 | 0 | 0 | 1 | 15 |
| 63 | 62 | 111111 | 111110 | 1 | 1 | 15 | 1 | 1 | 14 | 48 | 47 | 110000 | 101111 | 1 | 1 | 0 | 1 | 0 | 15 |
| | | | | | | | | | | 63 | | 000000 | 111111 | 0 | 0 | 0 | 1 | 1 | 15 |

Figure 23

| G | V | G | V | G | | | V | | |
|---|---|---|---|---|---|---|---|---|---|
| | | | | KR | RF | N | KR | RF | N |
| 0 | | — | | | | | | | |
| 1 | 0 | 000001 | 000000 | 0 | 0 | 1 | 0 | 0 | 0 |
| 2 | 1 | 000010 | 000001 | 0 | 0 | 2 | 0 | 0 | 1 |
| 3 | 2 | 000011 | 000010 | 0 | 0 | 3 | 0 | 0 | 2 |
| 4 | 3 | 000100 | 000011 | 0 | 0 | 4 | 0 | 0 | 3 |
| 5 | 4 | 000101 | 000100 | 0 | 0 | 5 | 0 | 0 | 4 |
| 29 | 28 | 011101 | 011100 | 0 | 1 | 13 | 0 | 1 | 12 |
| 30 | 29 | 011110 | 011101 | 0 | 1 | 14 | 0 | 1 | 13 |
| 31 | 30 | 011111 | 011110 | 0 | 1 | 15 | 0 | 1 | 14 |
| 32 | 31 | 100000 | 011111 | 1 | 0 | 0 | 0 | 1 | 15 |
| 33 | 32 | 100001 | 100000 | 1 | 0 | 1 | 1 | 0 | 0 |
| 34 | 33 | 100010 | 100001 | 1 | 0 | 2 | 1 | 0 | 1 |
| 35 | 34 | 100011 | 100010 | 1 | 0 | 3 | 1 | 0 | 2 |
| 59 | 58 | 111011 | 111010 | 1 | 1 | 11 | 1 | 1 | 10 |
| 60 | 59 | 111100 | 111011 | 1 | 1 | 12 | 1 | 1 | 11 |
| 61 | 60 | 111101 | 111100 | 1 | 1 | 13 | 1 | 1 | 12 |
| 62 | 61 | 111110 | 111101 | 1 | 1 | 14 | 1 | 1 | 13 |
| 63 | 62 | 111111 | 111110 | 1 | 1 | 15 | 1 | 1 | 14 |

Figure 24 ced elements of information; combining some or all of each of the elements with time information associated with recordal of the event to fill a first set of places in the data field and using the cryptographic record to fill a second set of places in the data record; communicating a message including the data field, wherein a receiving the message can recover the

COMMUNICATION OF SENSITIVE DATA IN RESTRICTED DATA CHANNEL

CROSS REFERENCE TO RELATED APPLICATION

This application claims the benefit of European Patent Application No. 20159634.3 filed on Feb. 26, 2020, the contents of which provisional application are hereby incorporated by reference for all purposes.

FIELD OF DISCLOSURE

The present disclosure relates to communication of sensitive data in a restricted data channel.

BACKGROUND TO DISCLOSURE

Complex data processing systems involving multiple entities linked by one or more networks typically require specific protocols for communicating data to ensure that the data is properly recognised and processed throughout the system. These protocols will typically place particular requirements on the different entities in the system, and they will typically develop over time to provide new capabilities and to reflect new technical developments.

It will typically not be practical to upgrade every entity in a distributed system of this type to support every capability of a new version of a protocol as soon as it is established. This is addressed by providing backwards compatibility in new versions of such protocols, so that it is possible to provide continued function using a more restricted set of capabilities than would be needed for full implementation of a latest version of a protocol. An example of this approach is in cellular communication standards—where a part of the system is not adapted to support 4G, backwards compatibility in the protocols allows use of 3G, EDGE or GPRS.

The implementation of transaction schemes has a similar issue. An extended infrastructure connects banks, merchants and cardholders through a series of different networks with a transaction scheme infrastructure mediating the authorisation of a transaction and settlement and clearing processes. The transaction scheme infrastructure itself will be adapted to implement a latest version of a protocol, but particular system elements—for example, the computing hardware of a merchant processing a transaction—may not be. This may require the constraints of an older version of the protocol to be adopted—these may for example include using a limited number of data fields because of significant constraints on the transmission of data in earlier versions of a protocol.

This may be problematic if enhancements to the protocol are for reasons fundamental to the effective technical operation of the system. One such reason may be system security—if an older version of a protocol provides unsatisfactory security, it may be strongly desirable to find a new approach that successfully addresses security concerns—in, for example, secure transmission of data or secure authentication of a user—while still observing the constraints required in older versions of the protocol as these are built in to the implementation of particular system elements. In the case of a transaction scheme, an older version of a protocol may for example only be adapted to identify particular elements of a payment card in a transaction (the PAN—Primary Account Number—the expiry date, and the CVC2 code). It would be desirable to address security concerns addressed by more advanced versions of a protocol, while maintaining the constraint that the older protocol imposes on the amount of communicable card data. It would be desirable to do this in such a way that requirements of the transaction scheme—for example, in allowing transaction details to be validated for up to 24 hours after they have been generated—can be met.

SUMMARY OF DISCLOSURE

In a first aspect, the disclosure provides a method of communicating information relating to an event using a data field, the method comprising: obtaining one or more elements of information relating to the event and determining a cryptographic record of the event using the one or more elements of information; combining some or all of each of the elements with time information associated with recordal of the event to fill a first set of places in the data field and using the cryptographic record to fill a second set of places in the data record; communicating a message including the data field, wherein a receiving the message can recover the one or more elements using the time information and can validate that the elements are correctly recovered by recalculating the cryptographic record from the recovered elements and matching the recalculated cryptographic record with the cryptographic record recovered from the data field.

Using this approach, a restricted data field can be used to communicate significant information concerning an event, with sufficient significant information being transmitted that full information can be reconstructed by the recipient, with a cryptographic record being available so that the recipient can determine that the reconstructed full information is correct. This is particularly valuable when information needs to be communicated from a first party to a second party through a protocol that does not allow for full information transfer, for example when the information needs to be transferred through a third party that only supports a limited data transfer protocol.

In embodiments, the event is a service instance, such as generation of a transaction record or transaction credentials. This may apply, for example, within a transaction scheme. Embodiments are described which relate to performance of digital transactions, and the constraint may then be that while transaction credentials may be generated and subsequently validated according to a recent protocol, the transaction data may need to pass through a channel or an entity (such as a merchant server or payment service provider) that only supports an older protocol with limited data fields.

In this transaction context, the elements may comprise a transaction counter. In certain embodiments, for example those relating to e-commerce transactions, the elements may comprise a random or an unpredictable number. In other embodiments, for example those relating to fully digital transactions, the elements may comprise a key identifier—in such cases, a change in key identifier may be synchronised with a change in time information, and a key identified by the key identifier may be used to compute the cryptographic record.

In embodiments, the first set of places further comprises one or more check bits for identification of the time information. This approach can be particularly beneficial in enabling the information elements to be recovered without a retry process, as it can remove the possibility of ambiguity in the time information.

In a second aspect, the disclosure provides a method of obtaining information relating to an event using a data field, the method comprising: receiving a message relating to an event wherein the message includes a data field; resolving the data field into a first set of places containing combined transaction elements and a second set of places comprising a cryptographic record of the event; determining time information associated with the recordal of the event, and using the time information to establish whole or partial elements of information relating to the event that had been combined with the time information to fill the first set of places in the data field; establishing whole elements of information relating to the event from any partial elements of information relating to the event; and calculating cryptographic record data from the elements of information relating to the event and establishing the elements of information relating to the event are correct by matching the calculated cryptographic record data against the cryptographic record from the second set of places in the data field.

This event may be a service instance. It may, for example in the context of a transaction scheme, comprise generation of a transaction record or transaction credentials, in which case the method may further comprise validating the transaction record or transaction credentials after obtaining the information relating to the event.

These elements may comprise a transaction counter. In embodiments, the elements may comprise a random or an unpredictable number. In other embodiments, the elements may comprise a key identifier. In this case, a change in key identifier may be synchronised with a change in time information, and a key identified by the key identifier is used to compute the cryptographic record.

In embodiments, establishing whole elements of information relating to the event from any partial elements of information relating to the event may comprises calculating the cryptographic record data and matching it against the cryptographic record from the second set of places in the data field, and if there is no match varying the time information and re-establishing whole elements of information relating to the event from any partial elements of information relating to the event using the varied time information. Such a retry process enables the method to be effective even when the event may have taken place at a time during an extended time period, in which case there is a significant likelihood of ambiguity in the time information.

In other embodiments, the first set of places further comprises one or more check bits for identification of the time information, and the one or more check bits are used to establish the correct time information before establishing whole or partial elements of information. This is an alternative approach to resolving ambiguity in time information—it may avoid the need for retry, at the cost of losing a small amount of information that can be communicated for one of the elements.

In embodiments, establishing whole elements of information relating to the event from any partial elements of information relating to the event may comprise calculating the cryptographic record data and matching it against the cryptographic record from the second set of places in the data field, and if there is no match varying one of the elements and recalculating and rematching the cryptographic record data according to a predetermined plan until there is a successful match. Such a retry process allows elements to be established accurately even when severe constraints in the volume of information that can be transmitted for that element leads to potential for ambiguity.

In a third aspect, the disclosure provides a computing node adapted to perform any of the method of the first aspect, the method of the second aspect, or the methods of both aspects.

DESCRIPTION OF SPECIFIC EMBODIMENTS

Specific embodiments of the disclosure are now described, by way of example, with reference to the accompanying drawings, of which:

FIG. 6 illustrates alternative strategies for repurposing an Expiry Date field and associated validity challenges;

Figure 22:
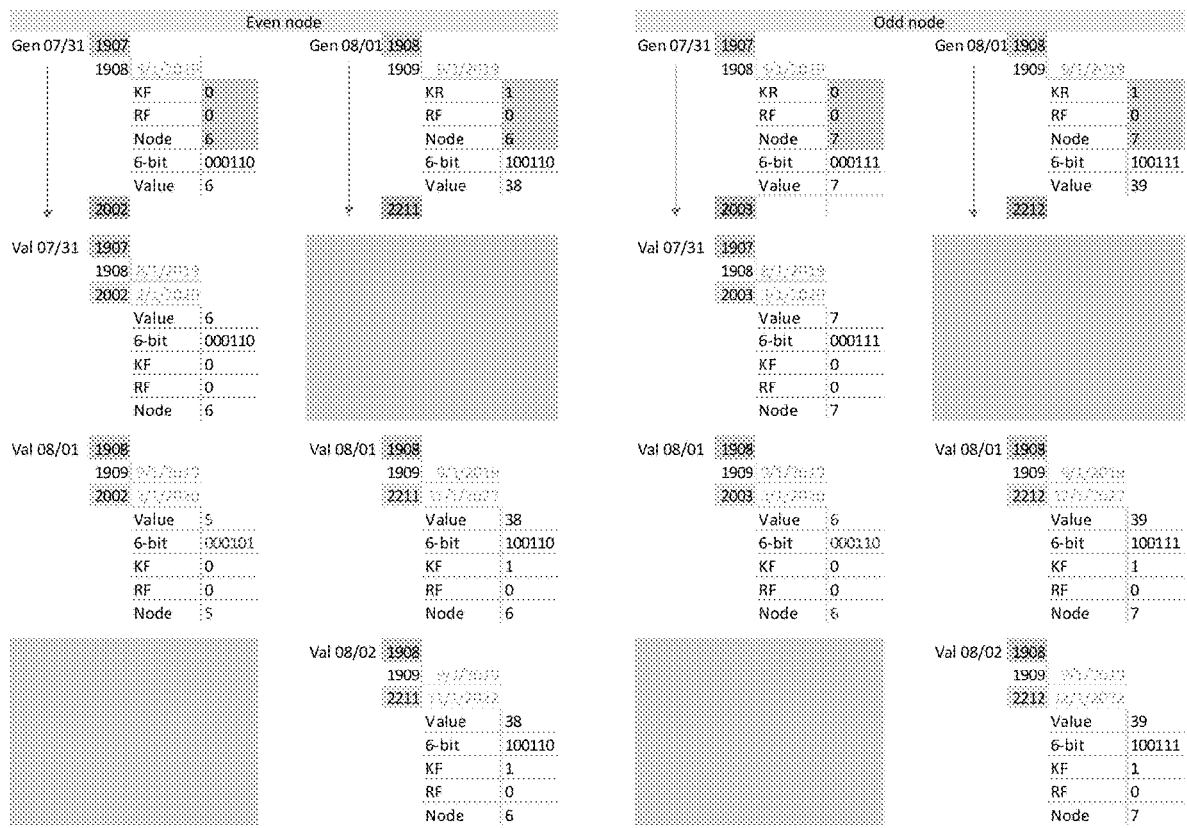
Figure 25:
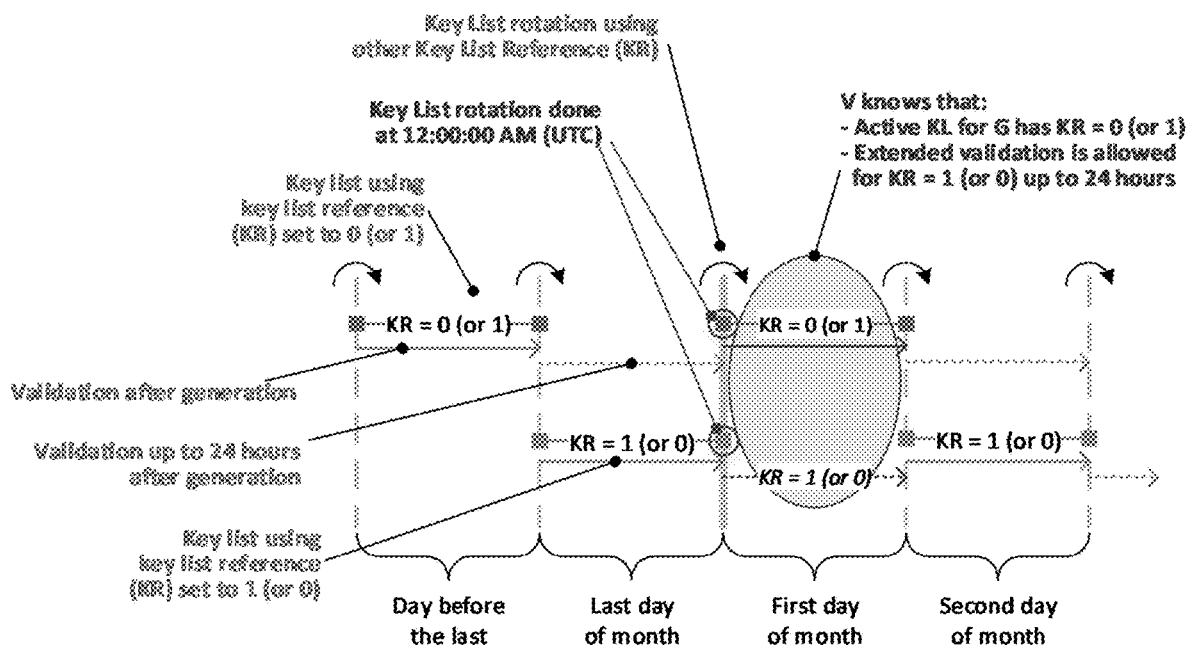

FIG. 22 indicates results using dynamic expiry date for the legacy use case around the end of a month for both even and odd nodes;

FIG. 23 shows consequences for node information, retry flag and key list reference in the context shown in FIG. 22;

FIG. 24 shows consequences for using key list reference to identify a key list in the context shown in FIG. 22; and FIG. 25 provides greater detail on use of key list reference to identify a key list when using a dynamic expiry date in a legacy use case in connection with beginning and end of month issues in the context shown in FIG. 22.

Figure 1:
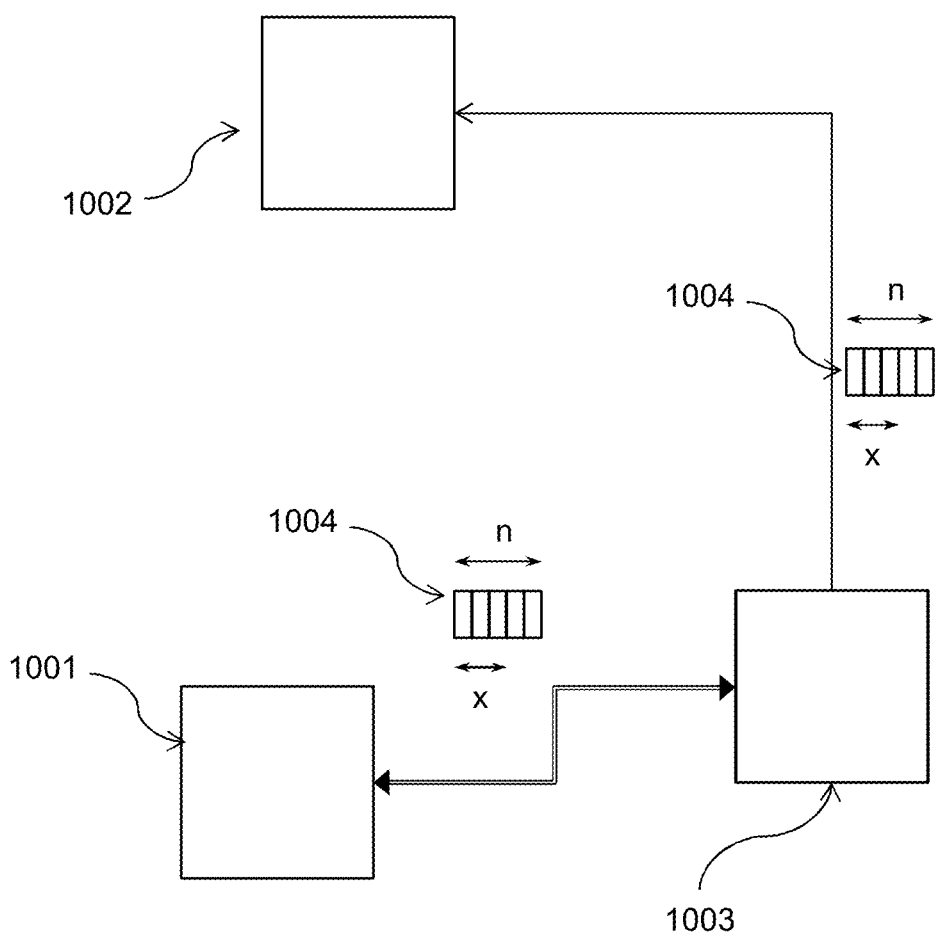
FIG. 1 shows a general approach adopted by elements of the disclosure in addressing technical problems associated with the communication of sensitive data over a restricted data channel.

In general terms, the problem addressed by the disclosure is illustrated in FIG. 1. A first computing entity 1001 generates sensitive data which it wishes to be available to a second computing entity 1002 for validation. Communication needs however to be mediated through a third computing entity 1003, with this communication involving a restricted data channel 1004.

There are at least two possible ways in which the data channel 1004 may be restricted. One is that the overall amount of data that can be transmitted is limited—in this case, the data channel only contains n places for data of a particular type to be transmitted. The other is that there may be constraints on the values that can be used in a particular field. In this case, x places of the total n places are constrained in the values that can be accepted.

In embodiments, information to meet security requirements is carried by repurposing original data fields. In particular, data fields for static data may be reused for dynamic data which contains information for use in additional security protocols. Both types of constraints create technical challenges. The limited number of places makes it difficult to convey the required amount of information. Various mechanism may be used to address this. One is conveying a limited amount of information directly, but by including a check mechanism—such as a hash—to ensure that the generator and the validator are performing the same calculation on the same data. In addition, the original purpose of a repurposed data field may create constraints on the values that can be used, particularly if the third computing entity 1003 continues to behave as though the original protocol is in place, and it is checking data accordingly.

One example of problems caused by a repurposed field is where the original field is for a date. One example is in a transaction scheme, where one transaction data field is for the expiry date of the relevant payment card, represented in MMYY format. If the first computing entity 1001 is a payment card or other payment device, the second computing entity 1002 is the authoriser of the transaction (an issuing bank or transaction scheme infrastructure acting on behalf of the issuing bank), while the third computing entity 1003 is a merchant point of sale terminal, then the third computing entity 1003 may be programmed to reject the potential transaction without forwarding it for authorisation if the expiry date is clearly incorrect—for example, if the month value is impossible, or the year value is too far into the future or in the past. Any reuse of such a field needs to ensure that the third computing entity 1003 does not prevent the data from even passing through the restricted data channel to the second computing entity 1002.

This combination of constraints can provide significant technical challenges as in order to meet security requirements, dynamic data changing from event to event may be desirable, rather than static data. One important security mechanism is for validity of credentials to be time limited. This requires time information in some form to be included in data transmitted from generator to validator. Length of validity of information also poses a challenge—the longer the period of validity, the more information that will typically need to be transferred, particularly if other relevant criteria—such as the cryptographic keys used for encoding—change over the validity period.

Embodiments of the disclosure illustrate different strategies for repurposing a limited number of fields, at least some of which are constrained, to contain dynamic data. Approaches include providing least significant bit data of key variables, and by then enabling reconstruction of the full key variables from known data. Approaches also include incorporation of combination of variable data with time data, and by establishment of the variable data by subtracting the time data. In such cases, it may be possible for the recorded time value to be different from the current time value—this may happen where there is an extended validity period, and where transactions may be held before transmission or where data may be provided out of sequence. The variation in time value will then be limited, and so may be addressed by an iterative retry process or by inclusion of check data.

Figure 2:
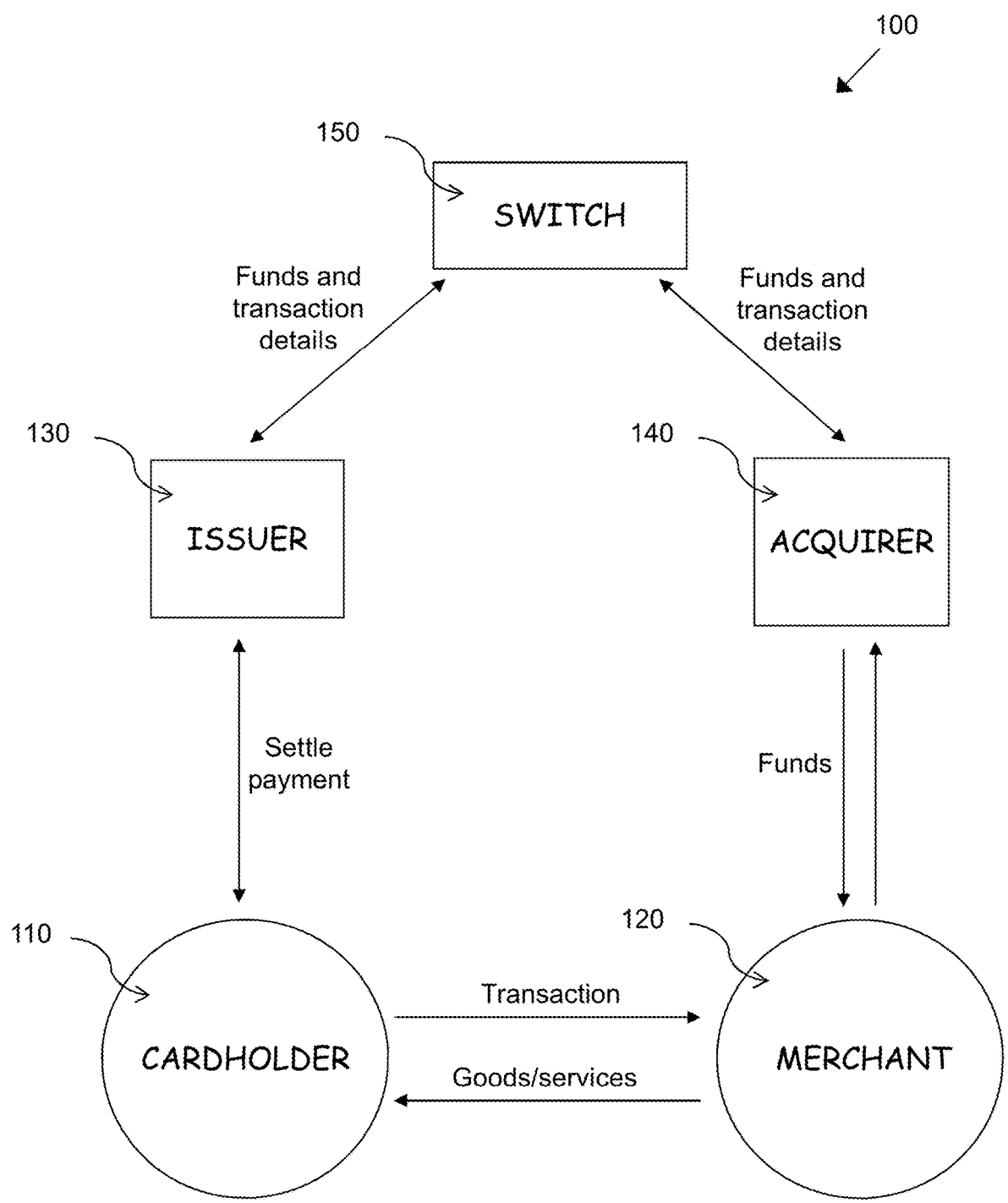
FIG. 2 shows schematically a distributed transaction architecture using a four-party model.

Embodiments will be described in more detail in the context of a transaction scheme. A suitable transaction scheme and infrastructure will first be described in more detail. FIG. 2 is a block diagram of a typical four-party model or four-party payment transaction scheme. The diagram illustrates the entities present in the model and the interactions occurring between entities operating in a card scheme.

Normally, card schemes—payment networks linked to payment cards—are based on one of two models: a three-party model or a four-party model (adopted by the present applicant). For the purposes of this document, the four-party model is described in further detail below.

The four-party model may be used as a basis for the transaction network. For each transaction, the model comprises four entity types: cardholder 110, merchant 120, issuer 130 and acquirer 140. In this model, the cardholder 110 purchases goods or services from the merchant 120. The issuer 130 is the bank or any other financial institution that issued the card to the cardholder 110. The acquirer 140 provides services for card processing to the merchant 120.

The model also comprises a central switch 150—interactions between the issuer 130 and the acquirer 140 are routed via the switch 150. The switch 150 enables a merchant 120 associated with one particular bank acquirer 140 to accept payment transactions from a cardholder 110 associated with a different bank issuer 130.

A typical transaction between the entities in the four-party model can be divided into two main stages: authorisation and settlement. The cardholder 110 initiates a purchase of a good or service from the merchant 120 using their card. Details of the card and the transaction are sent to the issuer 130 via the acquirer 140 and the switch 150 to authorise the transaction. The cardholder 110 may have provided verification information in the transaction, and in some circumstances may be required to undergo an additional verification process to verify their identity (such as 3-D Secure in the case of an online transaction). Once the additional verification process is complete the transaction is authorized.

On completion of the transaction between the cardholder 110 and the merchant 120, the transaction details are submitted by the merchant 120 to the acquirer 140 for settlement.

The transaction details are then routed to the relevant issuer 130 by the acquirer 140 via the switch 150. Upon receipt of these transaction details, the issuer 130 provides the settlement funds to the switch 150, which in turn forwards these funds to the merchant 120 via the acquirer 140.

Separately, the issuer 130 and the cardholder 110 settle the payment amount between them. In return, a service fee is paid to the acquirer 140 by the merchant 120 for each transaction, and an interchange fee is paid to the issuer 130 by the acquirer 140 in return for the settlement of funds.

In practical implementations of a four-party system model, the roles of a specific party may involve multiple elements acting together. This is typically the case in implementations that have developed beyond a contact-based interaction between a customer card and a merchant terminal to digital implementations using proxy or virtual cards on user computing devices such as a smart phone.

Figure 3:
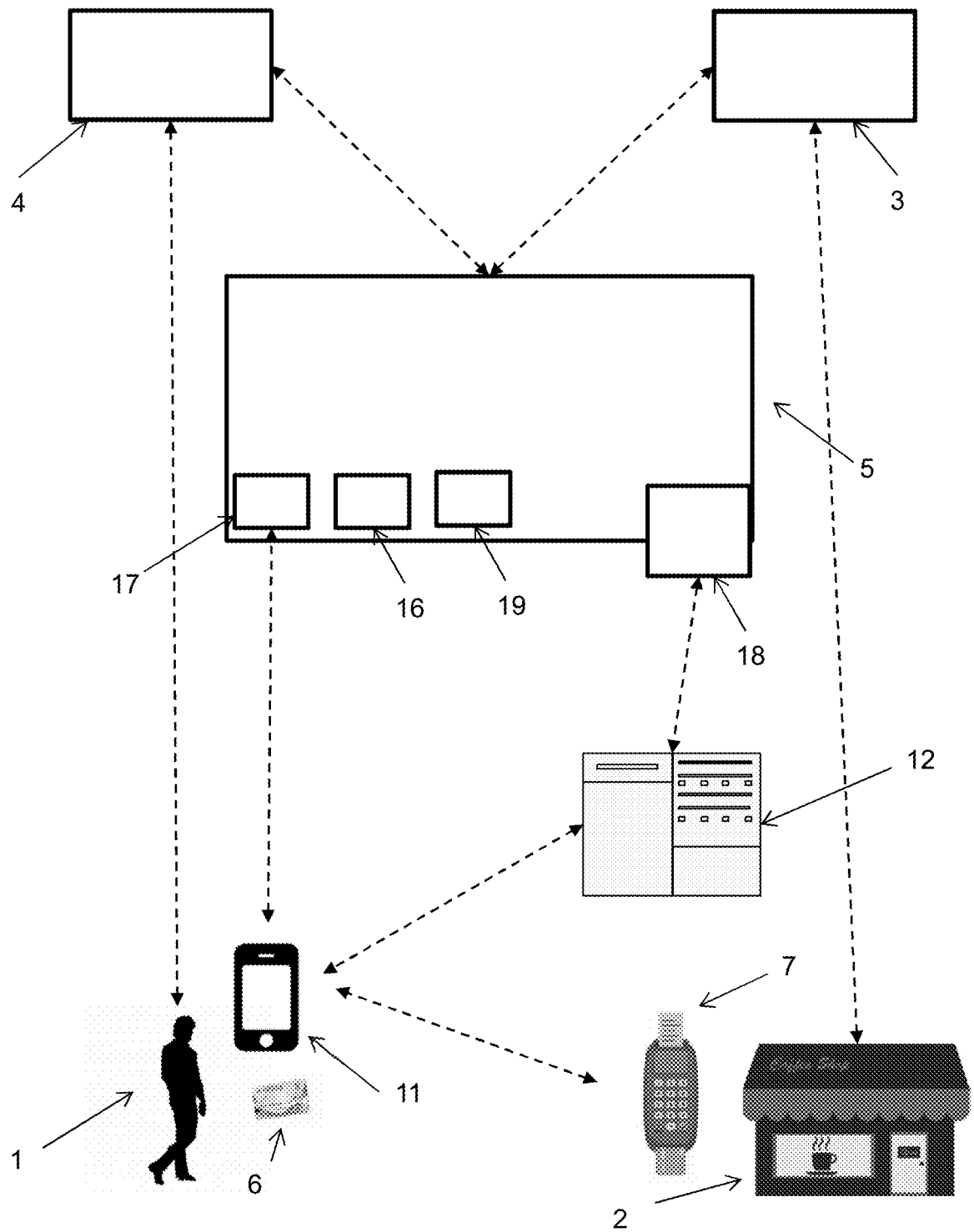
FIG. 3 illustrates elements of a complex distributed system adapted to implement the transaction architecture of FIG. 2.

FIG. 3 shows an architecture according to an embodiment of the disclosure appropriate for interaction between a cardholder and a merchant. This Figure shows a general-purpose architecture for reference, but it shows elements of an architecture used when a cardholder carries out an online transaction with a merchant server.

For a conventional transaction, a cardholder will use their payment card 6—or a mobile computing device such as smartphone 11 adapted for use as a contactless payment device—to transact with a POS terminal 7 of a merchant 2. However, in embodiments relevant to the present invention, the cardholder will use his or her computing device—which may be any or all of a cellular telephone handset, a tablet, a laptop, a static personal computer or any other suitable computing device (here cellular telephone handset or smartphone 11 is shown)—and other computing devices such as a smart watch or other wearable device may also be used)—to act either as a proxy for a physical payment card 6 or as a virtual payment card operating only in a digital domain. The smartphone 11 may achieve this with a mobile payment application and a digital wallet, as described below. The smart phone 11 can use this to transact with a merchant POS terminal 7 using NFC or another contactless technology, or to make a payment in association with its wallet service as discussed below. However, online transactions with a merchant are of particular interest in connection with embodiments of the disclosure, rather than contact or contactless transactions with a merchant POS terminal 7. To make an online transaction, the smartphone 11 may also be able to interact with a merchant server 12 representing the merchant 2 over any appropriate network connection, such as the public internet—the connection to the merchant may be provided by an app or application on the computing device.

The transaction scheme infrastructure (transaction infrastructure) 5 here provides not only the computing infrastructure necessary to operate the card scheme and provide routing of transactions and other messaging to parties such as the acquirer 3 and the issuer 4, but also a wallet service 17 to support a digital wallet on the cardholder computing device, and an internet gateway 18 to accept internet based transactions for processing by the transaction infrastructure. In other embodiments, the wallet service 17 may be provided similarly by a third party with an appropriate trust relationship with the transaction scheme provider. To support tokenization, a token service provider 19 is present (again, this is shown as part of transaction infrastructure 5 but may be provided by a third party with appropriate trust relationships), and the transaction scheme infrastructure provides a digital enablement service 16 to support the performance of tokenized digital transactions, and to interact with other elements of the system to allow transactions to be performed correctly—this digital enablement service may include other elements, such as token service provision.

For a tokenized transaction, the transaction is validated in the transaction scheme by mapping the cardholder token to their card PAN, checking the status of the token (to ensure that it is in date and otherwise valid) and any customer verification approach used. This allows the issuer to authorise the transaction in the normal manner.

Figure 4:
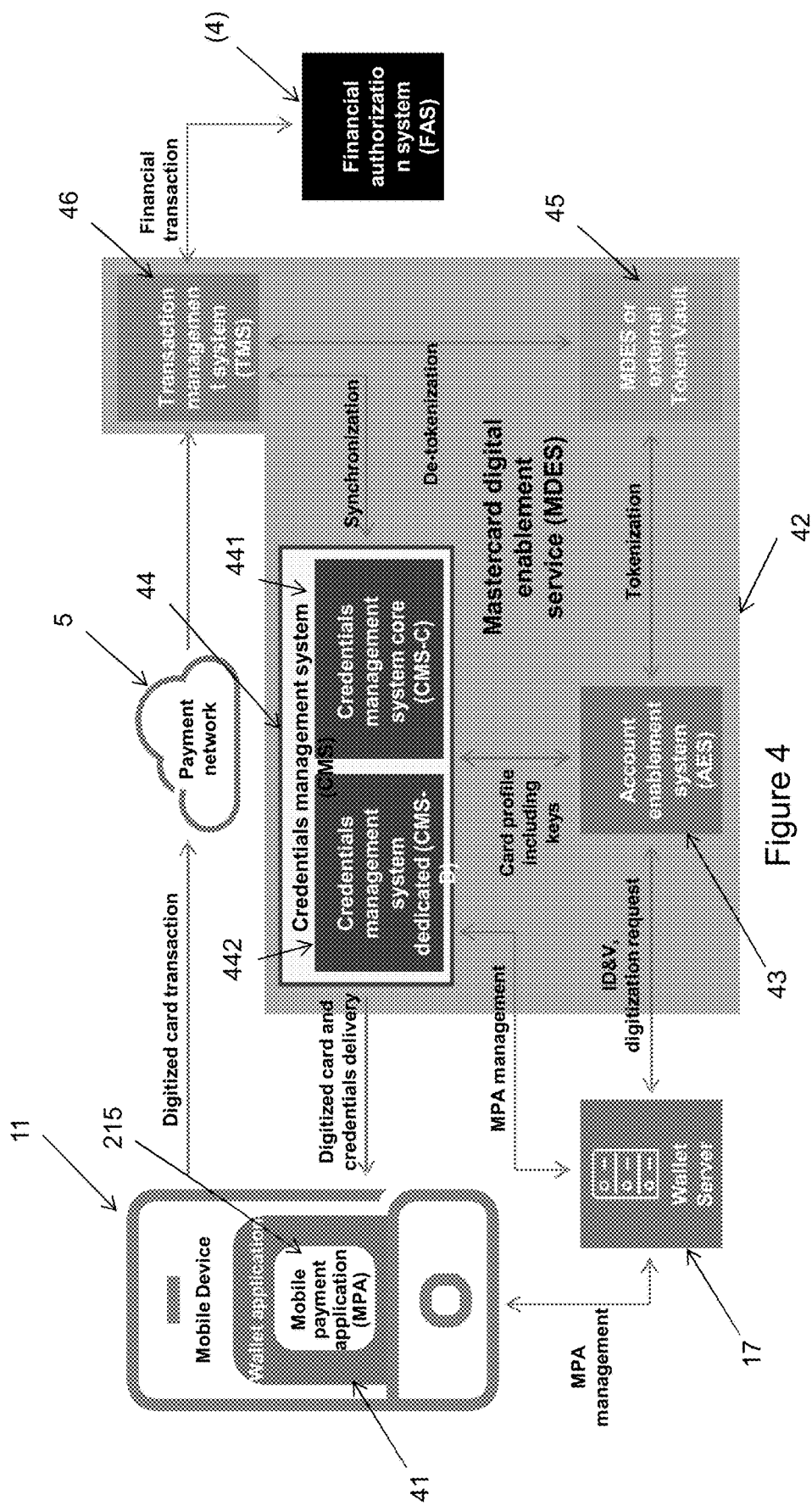
FIG. 4 shows schematically an exemplary system for enabling digital transactions in the transaction architecture of FIGS. 2 and 3.
Figure 5:
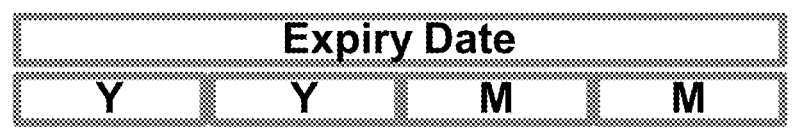
FIG. 5 illustrates an Expiry Date field as used in EMV protocols.

FIG. 4 shows elements of a transaction infrastructure to support digitized payments from a mobile device in more detail. This Figure shows as a specific example the applicant's Mastercard Cloud-Based Payment (MCBP) architecture—this is exemplary rather than specific to the invention, and illustrates how the architecture is used to support a mobile payment application 215 on a mobile device (such as smartphone 11)—here the mobile payment application 215 is shown as contained within a wallet application or digital wallet 41. Such a digital wallet 41 may communicate with a wallet server 17 to allow management of the mobile payment application, and it also can be used to request digitization of a payment card 6 to be used by the mobile device 11.

The Mastercard Digital Enablement Service (MDES) 42 performs a variety of functions to support mobile payments and digitized transactions. As indicated above, the MDES 42 is exemplary only—other embodiments may use digitization, tokenization and provisioning services associated with other transaction processing infrastructures, for example. The wallet server 17 is not a part of the MDES 42—and need not be present, for example if the mobile payment application 215 is not embedded within a digital wallet 41—but acts as an interface between the mobile device 11 and the MDES 42. The MDES 42 also mediates tokenized transactions so that they can be processed through the transaction scheme as for conventional card transactions. The following functional elements shown within the MDES 42: the Account Enablement System (AES) 43, the Credentials Management System (CMS) 44, the Token Vault 45, and the Transaction Management System (TMS) 46. These will be described briefly below.

The Account Enablement System (AES) 43 is used in card digitisation and user establishment. It will interact with the mobile payment application (here through the wallet server 17) for card digitisation requests and will populate the Token Vault 45 on tokenization and will interact with the CMS 44 to establish a card profile with associated keys for digital use of the card.

The Credentials Management System (CMS) 44 supports management of cardholder credentials and is a key system within the MDES 42. The core system 441 manages synchronisation with the transaction system as a whole through interaction with the TMS 46 and manages the channel to the AES 43. The dedicated system 442 provides delivery of necessary elements to the mobile payment application such as the digitized card and credentials and keys in the form needed for use. This system may also interact with the wallet server 17 for management of the mobile payment application.

The Token Vault 45—which is shown here as within the MDES 42, but which may be a separate element under separate control—is the repository for token information including the correspondence between a token and the associated card. In processing tokenized transactions, the MDES 42 will reference the Token Vault 45, and tokenization of a card will result in creation of a new entry in the Token Vault 45.

Transaction Management System (TMS) 46 is used when processing tokenized transactions. If a transaction is identified by the transaction scheme as being tokenized, it is routed to the TMS 46 which detokenizes the transaction by using the Token Vault 45. The detokenized transaction is then routed to the issuer (here represented by Financial Authorisation System 47) for authorisation in the conventional manner. The TMS 46 also interacts with the CMS 44 to ensure synchronisation in relation to the cardholder account and credentials.

Embodiments of the disclosure may be performed using the architecture shown in FIGS. 3 and 4. As previously noted, digital transactions such as those made in online commerce are of particular interest. In online commerce, a consumer will typically be interacting with a merchant server through a website over the browser (or a specific app) on the user's computing device. The user will use their credit card for a transaction, but the card will not be present and the consumer is here not transacting through a payment application on their own computing device but is using the payment card in a manner similar to a conventional "cardholder not present" (CNP) transaction, in which the merchant receives specific details of the payment card, but will not receive an application cryptogram generated by the payment card itself, or by a payment application on a user computing device.

In such cases a possible limitation is that a system entity such as the merchant server—or a payment service provider gateway supporting the merchant—may be operating under an old protocol version, and so will only be able to support very limited provision of payment card data. An approach to managing the provision of dynamic data using limited data fields allowed by older protocol versions is described with reference to FIGS. 5 to 12. This approach relates to performance of digital transaction using a transaction scheme, and it is applicable to online payment as described above—it has particular relevance to online commerce, and in particular to Secure Remote Commerce (SRC—https://www.emvco.com/emv-technologies/src/), which is a set of specifications developed by or for EMVCo that provide a secure approach to the processing of e-commerce transactions. Using SRC, a transaction may be identified by Dynamic Token Data (DTD), where the transaction is performed using a token (managed by an architecture as shown in FIGS. 3 and 4) rather than a PAN and content is varied with each transaction. Cardholder authentication is performed using a separate mechanism, 3DS (a version of 3-D Secure, discussed for example at https://en.wikipedia.org/wiki/3-D_Secure, suitable for use for cardholder authentication in Card Not Present (CNP) transactions). The DTD data needs therefore to be sufficient to identify the transaction and to allow an authoriser to determine that the transaction is legitimate, and it is desirable for DTD data generation to be independent of the 3DS process (preferably so that this could be done either before or after any call to the 3DS process).

As in the example discussed above, it is assumed that only legacy fields in transaction data are available for DTD data: PAN, Expiry Date and CVC2. The DTD data should be such that the content varies with each transaction but that there is a clear binding to the relevant token used, and while the data does not need to be an EMV cryptogram of an existing type it needs to be such that legitimacy of the transaction can be verified.

Exemplary content of Dynamic Token Data—in particular, of Dynamic Expiry Date and Dynamic CVC forming part of Dynamic Token Data—will now be described, as will processes for generation and validation of these values in the context of a Secure Remote Commerce transaction. It should be noted that this approach is applicable to any product or service using a tokenized transaction and is not limited to SRC, and that where reference is made to SRC transactions below the person skilled in the art will appreciate that there is no intention to limit the use of the functionality described to the context of an SRC transaction.

As noted previously and as shown in FIG. 5, Expiry Date comprises four values in the form YYMM, with YY used to carry "year" information (YY being a two-digit value between 00 and 99) and MM used to carry "month" information (MM being a two-digit value between 01 and 12). In the original legacy EMV context, this was a static value, defining the lifetime of a (physical) payment card, the card ceasing to be valid after the expiry date had passed.

An intermediary computing system using a legacy version of the protocol—a Payment Service Provider or a merchant server—may invalidate a transaction if the Expiry Date value appears to be invalid or impossible. This poses a significant restraint on the dynamic data that can be carried in this field—the dynamic data must correspond to a possible date, this date must not be in the past, but it must also not be too far into the future to be credible. If 6 bits of data are carried, this would require date values to be up to 5-6 years into the future—these should not be rejected by legacy systems. However, to use 7 bits would require expiry dates up to 10 years into the future, 8 bits 20 years and 9 bits 40 years—a 7-bit solution would risk failure whereas an 8- or 9-bit solution would not be viable. This is illustrated in exemplary form in FIG. 6.

There are two data types that it would be desirable to carry in the Expiry Date field. One is Application Transaction Counter (ATC) data—this has been described above and is a counter provided at a transaction data generator incremented on the creation of relevant transaction data. The other is Unpredictable Number (UN) data. The Unpredictable Number is a value used to provide variability and uniqueness in cryptogram generation—different methods of UN generation are possible, with the overall size of the UN and the unlikelihood of the process to generate it being replicated by an attacker being the main factors in security. The ATC and UN values are used to generate a cryptogram in a DTD transaction, and are recovered by the entity responsible for validation of the dynamic token data.

If 6 bits are available, a preferred choice is for 3 bits to be allocated to the ATC and 3 bits to the UN. The next best choice is for 2 bits to be allocated to the ATC and 4 bits to the UN—it is however felt that the consequent increase in security of the UN is outweighed by the risk of errors in processing a basket of goods or services from several merchants, as this may involve the very rapid performance of a number of transactions and may cycle the ATC value if only 2 bits are used.

As also noted previously, CVC2 (the Card Security Code) is a three digit field originally used to carry a static 3-digit value between 000 and 999—it is printed on the rear side of a conventional payment card and used as a confirmation that the cardholder is making the transaction as the cardholder is expected to have physical possession of the payment card.

Using Dynamic Token Data, this static value is replaced by a Dynamic CVC—this is a 3-digit cryptogram generated as part of a DTD transaction.

Figure 7:
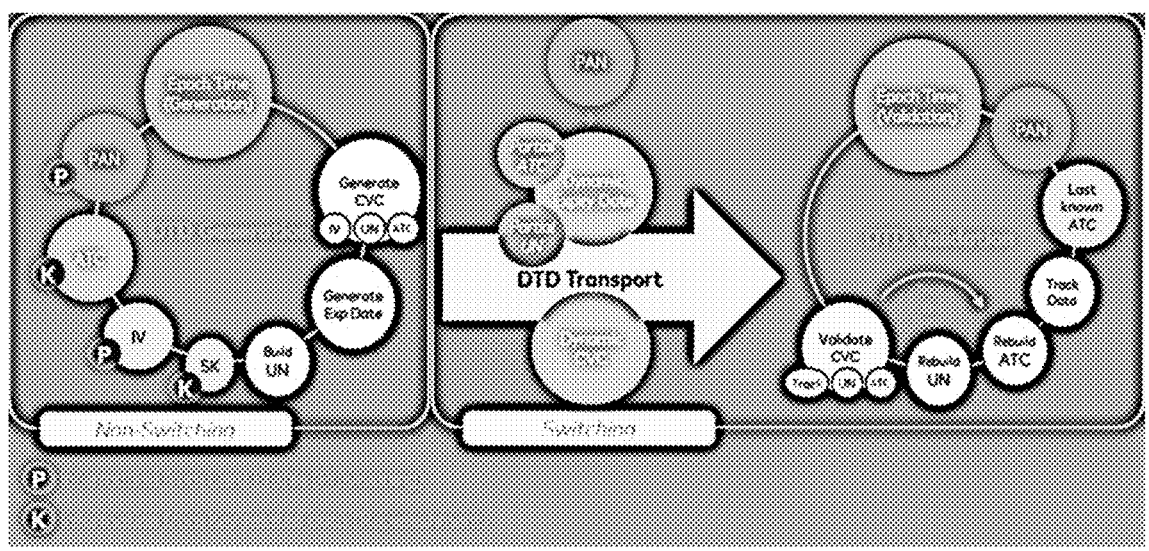
FIG. 7 illustrates a general approach for generation, transport and validation of dynamic transaction data (DTD)

DTD generation, transport and validation processes will now be described with reference to FIG. 7. In the generation and validation processes, the relevant computing entities are adapted to perform current versions of EMV protocols and are aware of and adapted to perform the relevant DTD process functions. In the transport process, however, it is necessary for the transport of DTD related data not to impact any transport of EMV transaction data and/or 3DS transaction data if the latter is used as part of the transaction flow.

The DTD generation process is described in detail below with reference to FIG. 8. The generator has access to information from the card profile: here, the relevant data is the PAN (or Token), referred to here as dtdToken; and the initial vector (IV) used for DTD transactions ivCvcTrackDtd. The initial vector can be generated using a cryptographic operation over a list of data containing for example some identification of the token such as defined when using track data including PAN, Service Code, Static Expiry Date and so on. The generator will also be able to provide unique transaction credentials for the DTD transaction: the ATC dtdATC; and a session key SK. There will also be a list of parameters associated with the transaction: optional additional data shared between generator and validator dtdAdditionalData; the number of bits of ATC carried using Dynamic Expiry Date dynamicExpiryDateNbrATCBits; and the number of bits of UN (which as will be shown below is time-based in this implementation) carried using Dynamic Expiry Date dynamicExpiryDateNbrUNBits. These latter two values may be kept static and equal to 3 if the preferred implementation (3 bits used for both ATC and UN) described above is used.

Figure 8:
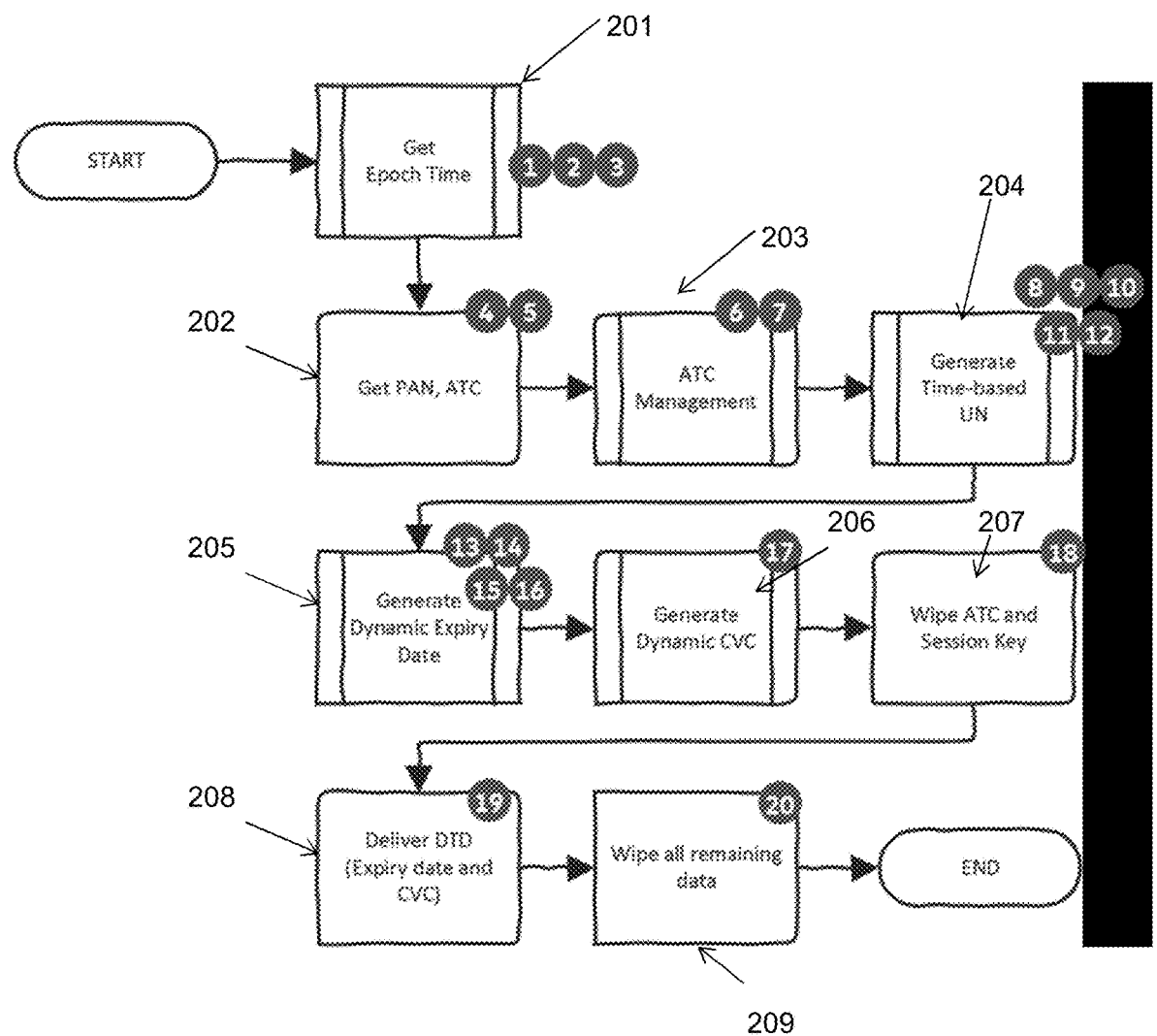
FIG. 8 illustrates schematically a process for generation of dynamic transaction data in accordance with an embodiment of the disclosure.

Referring to FIG. 8, a full process for generating Dynamic Token Data is described. Firstly, an Epoch Time value is obtained 201. The initial value obtained is the Unix Epoch Time when Dynamic Token Data generation is initiated—here dtdGenUET. This is the number of seconds elapsed since midnight (UTC) on Jan. 1, 1970, ignoring leap seconds. This value is adjusted by an appropriate ratio to provide a value dtdAdjGenUET and a reference time is obtained by using modulo 100000 of the adjusted Unix Epoch Time to provide a value dtdRefTimeGenUET.

After this, the Card Profile data needed is obtained 202—this comprises the value of the PAN/Token dtdToken and the value of the ATC of the session key (SK) to be used to generate the DTD Dynamic CVC, dtdATC.

The relevant part of the ATC is then extracted and reformatted 203. The n least significant bits (rightmost) of the ATC are extracted as dtdLSbATCBin, with n defined by the parameter dynamicExpiryDateNbrATCBits. This value dtdLSbATCBin is then converted to a decimal value dtdLSbATCNum.

The next step is to generate 204 a time-based unpredictable number. To do this, a buffer is created of the token value and the relevant part of the ATC:

Buffer=dtdToken|dtdLSbATCNum

If optional data dtdAdditionalData is non-zero, this may be appended to the right of the buffer—padding may also be used to make the length of the buffer even. This buffer is then hashed using SHA256 to form dtdGenHash, after which the buffer is wiped. Other choices could be made for the hash—for example, SHA512 could be used rather than SHA256, or another hashing mechanism such as SM3 could be used.

As for the ATC previously, the three least significant bits of the hash are extracted as dtdLSBGenHash and converted to a numerical value dtdLSBGenHashNum. This is then converted to a modulo 100000 value dtdLSBGenHashNumMod and the time-based unpredictable number is calculated by adding this value to the time value module 100000.

dtdGenUN=(dtdRefTimeGenUET+dtdGenHashNumMod)MOD 1000000

Figure 9:
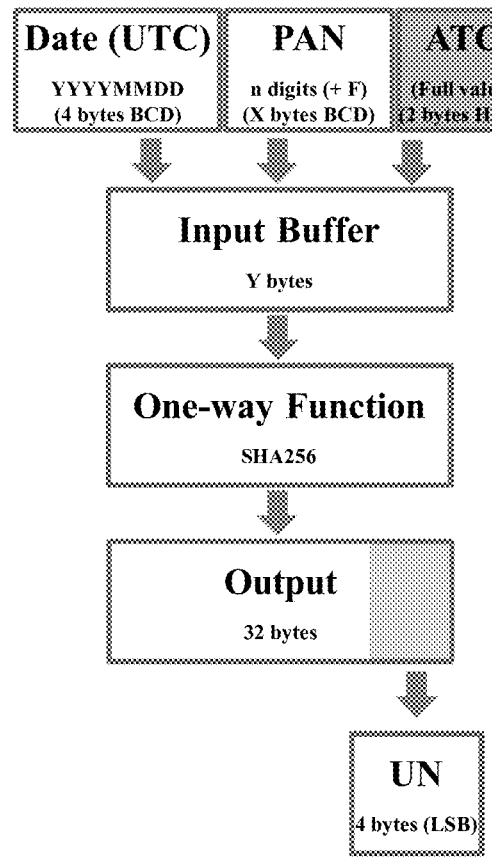
FIG. 9 illustrates one approach to Unpredictable Number generation usable in the process of FIG. 8.
Figure 10:
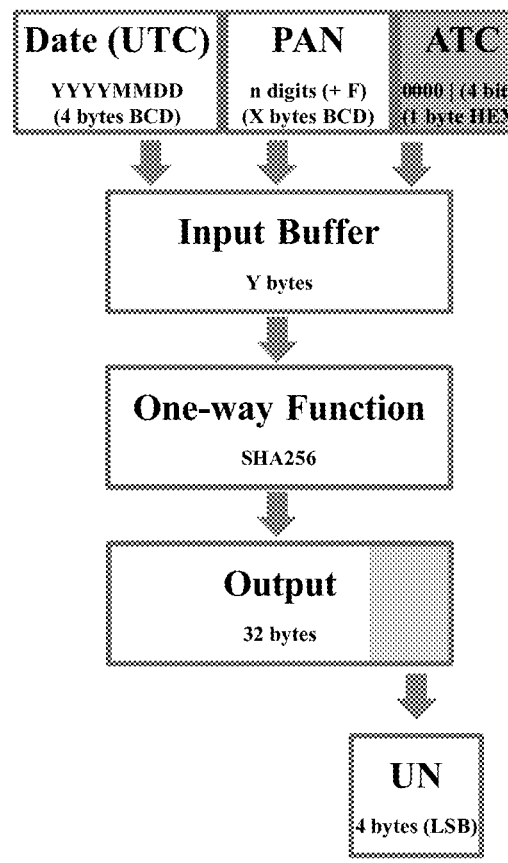
FIG. 10 illustrates an alternative approach to Unpredictable Number generation usable in the process of FIG. 8.

A number of variations are possible in generating the Unpredictable Number, as shown in FIGS. 9 and 10—these show other approaches which both take a different form of the UTC date, but which take two different approaches to including ATC data. In both variations, a Y byte buffer is constructed from a 4-byte BCD (binary coded decimal) UTC date—in this case, in YYYYMMDD format—and appropriate PAN and ATC contributions. In both cases, the PAN is provided as an n digit value, padded if necessary, from which an X byte BCD value is formed. The approach to providing an ATC value differs, however: in the first case shown in FIG. 9, the full ATC value is used and provided as a 2-byte hexadecimal value, whereas in the second case shown in FIG. 10, the least significant 4 bits are provided and form a 1-byte hexadecimal value. In both cases, these are used to form a Y byte input buffer on which a one-way function (such as SHA256) operates to provide a 32-byte output, with the four least significant bits used to provide the unpredictable number. The skilled person will be aware that the principles applied here may be implemented with minor variations to provide other implementations of an Unpredictable Number generation process.

All the elements are now available for the Dynamic Expiry Date to be generated 205. The n least significant bits are extracted from the reference time—n is defined by dynamicExpiryDateNbrUNBits and the resulting output is dtdRefTimeGenUETBin. The ATC and time values are then expressed as a number of months:

dtdGenNbrMonthsBin=dtdLSbATCBin|dtdRefTimeGenUETBin

This binary value is then converted to a numerical value dtdGenNbrMonths. The next month is identified using dtdGenUET, and expressed as a value dtgGenYYMM Next, which is dtdGenYYMM+1. The Dynamic Expiry Date is calculated by simply adding the numerical value calculated to the next month value:

dtdDynamicExpiryDate=addMonths(dtdGenYYMMNext,dtdGenNbrMonths)

with dtdGenYYMMNext the reference, and dtdGenNbrMonths the number of months to be added. Using this approach, the Dynamic Expiry Date will appear to be legacy processors to be a valid Expiry Date, as it has the correct format, does not lie in the past, and does not lie too far into the future.

Figure 11:
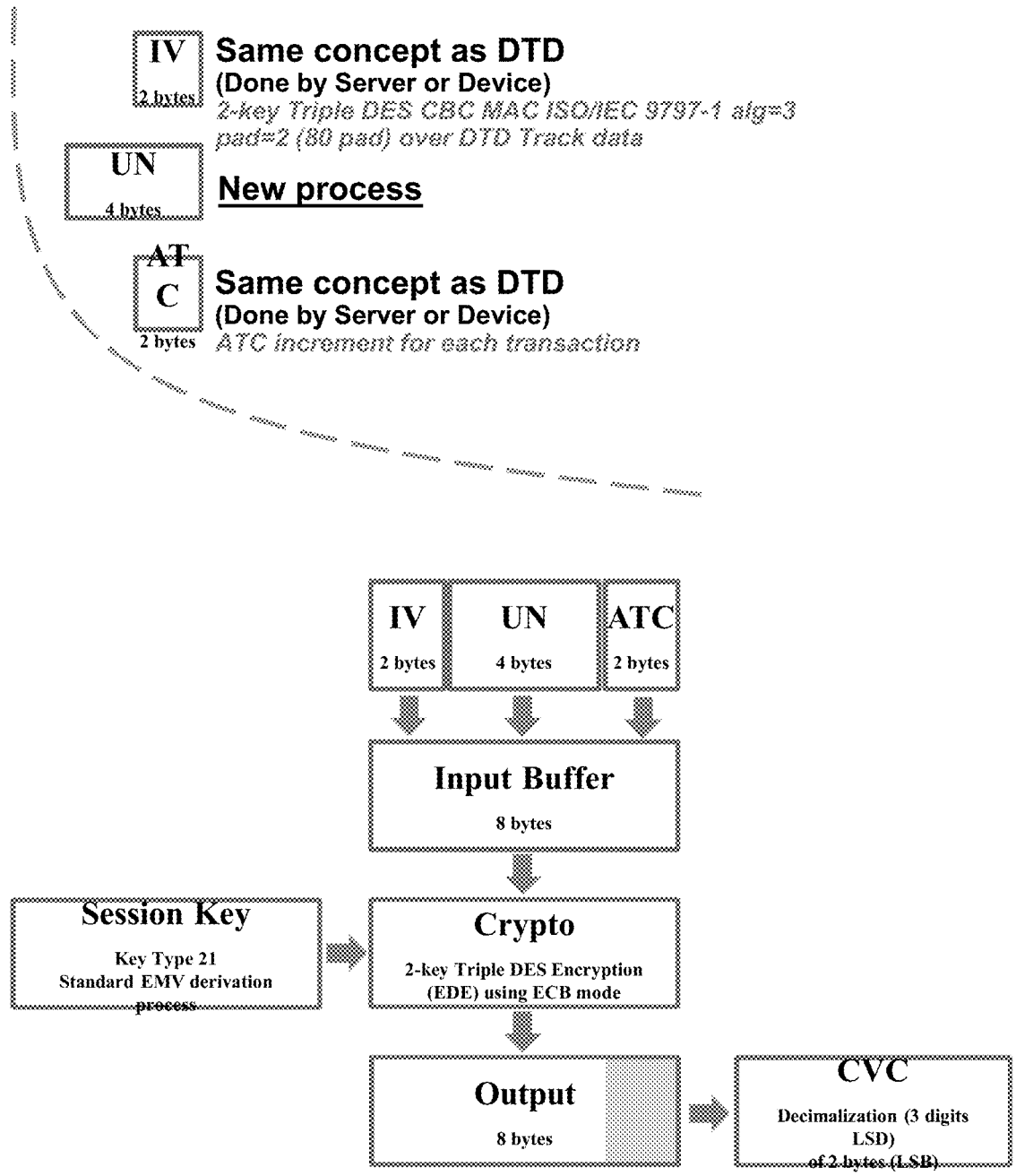
FIG. 11 illustrates in more detail the process of Dynamic CVC generation shown in FIG. 8.

The next step is to generate 206 the DTD Dynamic CVC. This process is also shown in FIG. 11. An 8-byte input buffer is formed from the concatenation of the IV value ivCvcTrackDtd, the 4-byte time-based UN dtdGenUN and the 2-byte ATC value dtdATC. The dynamic CVC value is then computed cryptographically from the buffer using the session key SK by an appropriate cryptographic process, such as DES3 (a 2-key Triple DES Encryption (EDE) using ECB mode), with the three least significant digits of the 8-byte result, expressed in decimal, used as the CVC. This may be expressed as:

dtdDynamicCVC=LSD(3,Byte2Dec(LSB(2,DES3(SK)[buffer])))

where LSB(n,X) is the least significant n bytes of byte string X and Byte2Dec(X) converts a string of bytes to an integer expressed in decimal (for example, Byte2Dec('C07E-)=49278). LSD(n,D) is the least significant n bits of an integer expressed in decimal. The buffer can be wiped once the Dynamic CVC value has been created.

After this the ATC value and the session key can be wiped 207, and the DTD values delivered 208 to the merchant (and so to the acquirer) as transaction data for use in an online authorization request for the transaction: a PAN (Token) value dtdToken, an Expiry Date value using DTD Dynamic Expiry Date dtdDynamicExpiryDate, and CVC2 using DTD Dynamic CVC dtdDynamicCVC. After this, all remaining data used in this process can be wiped 209.

The transport process is straightforward, as all transaction data has the format of legacy transaction data. If the merchant or the acquirer or any associated system entity (such as the merchant's payment service provider (PSP)) is only adapted to use legacy versions of the protocol, this will not affect the routing of the transaction data from the merchant to the acquirer to the transaction scheme for authorisation. At this point, the dynamic token data needs to be validated.

Figure 12:
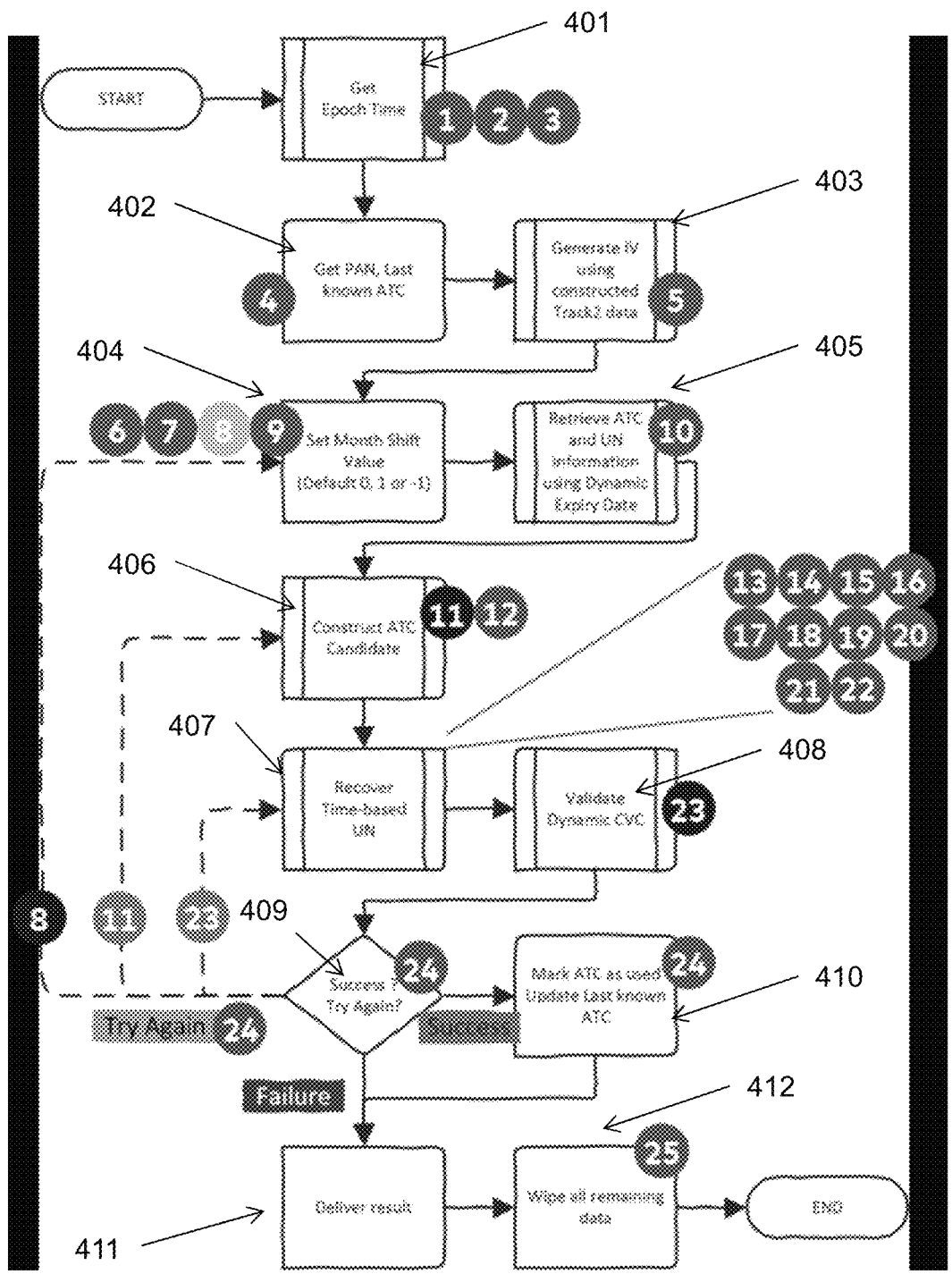
FIG. 12 illustrates schematically a process for validation of dynamic transaction data in accordance with an embodiment of the disclosure.

This validation process is described in detail in FIG. 12—validation is specifically required of the DTD Dynamic CVC value dtdDynamicCVC, which is provided to the validator through the CVC2 field along with the dtdToken and dtdDynamicExpiryDate values provided through the PAN(Token) and Expiry Date fields respectively from the transaction date provided in the legacy formatted EMV Authorisation Request.

The validator will have access to various information, and also to a HSM (Hardware Security Module) capable of performing necessary cryptographic computation. Specifically, these resources are as follows.

The validator has access to the following information associated with the PAN(Token):
Cryptographic Keys such as the Issuer Master Key: IMK
Last known ATC: dtdLastKnownATC
Information to construct the Track data (trackDtd) that will be used to generate the IV value (ivCvcTrackDtd) using the following values:
trackDtdExpiryDate: "xxxx" value in "trackDtd"
trackDtdServiceCode: "yyy" value in "trackDtd"
trackDtdPanSequenceNumber: "z" value in "trackDtd"
where the (trackDtd) is a 19-byte value: "<PAN>Dxxxxyyyz000000000000F"
with <PAN> set to dtdToken, D defined as a delimiter and "000000000000F" defined as a filler.

The person skilled in the art will appreciate that the format is similar to what is commonly used to create Track 2 data, but any equivalent mechanism can be used to identify the token.

The validator has access to the following list of parameters:
Any optional additional data shared between the "generator" and the "validator":
dtdAdditionalData (may be unused in a simplified version)
Number of bits of ATC carried using Dynamic Expiry Date:
dynamicExpiryDateNbrATCBits (may be set to 3 in simplified version)
Number of bits of time-based UN carried using Dynamic Expiry Date:
dynamicExpiryDateNbrUNBits (may be set to 3 in simplified version)
Threshold for adjustment (up) of Expiry Date in case of failure of DTD Validation:
dtdMonthShiftUpThreshold, a value hh:mm:ss PM expressed using GMT timezone
(eg 11:55:00 PM GMT)
Threshold for adjustment (down) of Expiry Date in case of failure of DTD
Validation: dtdMonthShiftDownThreshold, a value hh:mm:ss AM expressed using GMT timezone (eg 00:05:00 AM GMT)

The HSM is able to generate a Card Master Key (CMK) and Session Key (SK) from the Issuer Master Key (IMK), to generate the IV from track data as indicated above and the Card Master Key (CMK), and to use the Session Key SK, IV, UN and ATC for CVC Validation.

The operations performed by the validator are illustrated generally in FIG. 12, and these are described in detail below. First of all, time information must be obtained 401. This can be carried out in exactly the same way as for the generator, as exactly the same information is available. The PAN (Token) value can simply be extracted 402 from the transaction data as dtdToken. The IV value can also be reconstructed 403 from the DTD transaction data, as this contains everything needed to reconstruct the Track data (trackDtd) used to generate the IV value (ivCvcTrackDtd). The value trackDtd is a 19-byte value "<PAN>Dxxxxyyyz000000000000F" used to identify the token being used for the transaction with xxxx being trackDtdExpiryDate (a static value that is not linked to the dynamic expiry date used in the context of DTD transactions), yyy trackDtdServiceCode (a static value used in legacy system to qualify the supported services for a transaction) and z trackDtdPANSequenceNumber (a static value that can be used to identify several cards sharing the same PAN value).

The next step is special to the validation process, and involves setting 404 the month shift value, which may be 0 (the default), 1 or −1. The first part of this is to establish the next month value dtdValYYMMNext by adding one to the current time dtdValYYMM, which is the YYMM format of dtdValUET. The DTD Dynamic Expiry Date (dtdDynamicExpiryDate) is then retrieved from DTD transaction data, and the next month value is subtracted from this to give the number of months computed by the generator—dtdGenNbrMonths.

The next step is to try to establish whether the month shift value is correct, which is determined by establishing whether or not the DTD Dynamic CVC can be validated, as discussed further below. The number of months is converted to a binary value (dtdGenNbrMonthsBin) and available ATC and UN information is extracted 405 from the DTD Dynamic Expiry date—the n most significant bits of dtdGenNbrMonthsBin form the n least significant bits of the ATC dtdLSbATCBin, and the m least significant bits of dtdGenNbrMonthsBin form the m least significant bits of the reference time dtdRefTimeGenUETBin, where n is defined by dynamicExpiryDateNbrATCBits and m is defined by dynamicExpiryDateNbrUNBits.

The next step after this is to construct 406 an ATC candidate from this data. This is done by retrieving the last known ATC value dtdLastKnownATC for that PAN(Token) dtdToken, which the validator will have access to through previous validation processes. The last known ATC value and the retrieved ATC information from the Dynamic Expiry Date will be used together to reconstruct the candidate ATC value dtdCandidateATC, typically the lowest value consistent with the ATC information from the Dynamic Expiry Date but higher than the last known ATC value. This is then converted to a decimal value dtdLSBATCNum.

The relevant elements are all available to recover 407 the time-based UN by replicating the process used to create it. As before, a temporary buffer is created of the token value and the relevant part of the ATC:

Buffer=dtdToken|dtdLSbATCNum

If optional data dtdAdditionalData is non-zero, this may be appended to the right of the buffer—padding may also be used to make the length of the buffer even. This buffer is then hashed using SHA256 to form dtdValHash, after which the buffer is wiped.

The three least significant bits of dtdValHash are extracted as dtdLSBValHash and converted to a numerical value dtdLSBValHashNum. This is then expressed in modulo 100000 as dtdLSBValHashNumMod. To create an Unpredictable Number candidate, the n least significant bits of dtdRefTimeValUET are masked (with n defined by dynamicExpiryDateNbrUNBits) and a first candidate for UN reconstruction dtdCandidateUN created, where dtdCandidateUN=dtdRefTimeValUETMasked+dtdRefTimeGenUETBin At this point, additional candidates for UN reconstruction are also created: dtdCandidateUN"−1 ", dtdCandidateUN"−2" and dtdCandidateUN"+1 ". These have the following values:

dtdCandidateUN"−1"=dtdCandidateUN−power(2,$n$)

dtdCandidateUN"−2"=dtdCandidateUN−power(2,$n$+1)

dtdCandidateUN"+1"=dtdCandidateUN+power(2,$n$)

These four candidates have the following recovered UN values: dtdRecoveredUN, dtdRecoveredUN"−1", dtdRecoveredUN"−2" and dtdRecoveredUN"+1", where:

dtdRecoveredUN=(dtdLSBValHashNumMod+dtdCandidateUN)MOD 100000 dtdRecoveredUN"−1"=(dtdLSBValHashNumMod+dtdCandidateUN"−1")MOD 100000 dtdRecoveredUN"−2"=(dtdLSBValHashNumMod+dtdCandidateUN"−2")MOD 100000 dtdRecoveredUN"+1"=(dtdLSBValHashNumMod+dtdCandidateUN"+1")MOD 100000

These are respectively the UN values for the most current possible generation time and the two earlier candidate times, and the next available time in the future compared to validation (possible in the event of out-of-sequence events). The next step is to compute the deltas between the reference time for validation of Dynamic Token Data and the list of candidates for UN reconstruction as above:

dtdValDelta=dtdRefTimeValUET−dtdCandidateUN dtdValDelta"−1"=dtdRefTimeValUET−dtdCandidateUN"−1"

dtdValDelta"−2"=dtdRefTimeValUET−dtdCandidateUN"−2"

dtdValDelta"+1"=dtdRefTimeValUET−dtdCandidateUN"+1"

Times will then be ranked, with "past" times ranked over "future" ones

The next step is to attempt to validate 408 the DTD Dynamic CVC.

To do this, the following are used:
 Track data (19 bytes): trackDtd—this is known;
 Recovered UN (4 bytes): dtdRecoveredUN—this is the current "best" candidate
 Candidate ATC (2 bytes): dtdCandidateATC—this is again the current "best" candidate
 The DTD Dynamic CVC is validated using a cryptographic function that compares the supplied Dynamic CVC against a computed CVC value using an 8-byte buffer created with the concatenation of ivCvcTrackDtd, dtdRecoveredUN and dtdCandidateATC.
  computedCVC=LSD(3,Byte2Dec(LSB(2, DES3(SK) [buffer with IV, UN and ATC]))), where DES3 is a 2-key Triple DES Encryption (EDE) using ECB mode
LSB (n,X) is the least significant (rightmost) n bytes of byte string X
Byte2Dec(X) converts a string of bytes to an integer expressed in decimal.
 For example Byte2Dec('C07E')=49278
LSD (n,D) is the least significant (rightmost) n digits of an integer expressed in decimal This validation process will succeed or fail, and this marks a decision point 409. If there is a success 410, then the current candidates (for UN and ATC) can be taken to be correct. The value for dtdLastKnownATC is updated using dtdCandidateATC, the ATC for that Session Key is marked as used, and the result of validation is reported (as a success). If there is a failure, there is a retry process according to the following criteria:
 Attempt to validate Dynamic CVC using the next recovered UN value (dtdRecoveredUN*) according to the ranking based on delta values (dtdValDelta*);
 If there are no more dtdRecoveredUN*** available, then try again to validate Dynamic CVC using another ATC candidate (dtdCandidateATC)—this can be attempted for all the recovered UN candidates;
 If there are no more dtdCandidateATC available, then try again to validate Dynamic CVC after adjusting the number of months (dtdGenNbrMonths)—this will require a recalculation of the ATC candidates and the recovered UN candidates, and the process can be carried out for all these new candidates according to the previous two steps. If this fails, a further month adjustment can be used. Month adjustments address "end of month" issues when generation occurs in one month and validation in another, as discussed earlier.
 If the validation (#23) is still a failure when all the month adjustment options have been addressed, then it is necessary report the result of validation (as a failure)

After delivery of the result 411, the computed and generated values that have not been actively stored in a step indicated above can be wiped 412.

Figure 13:
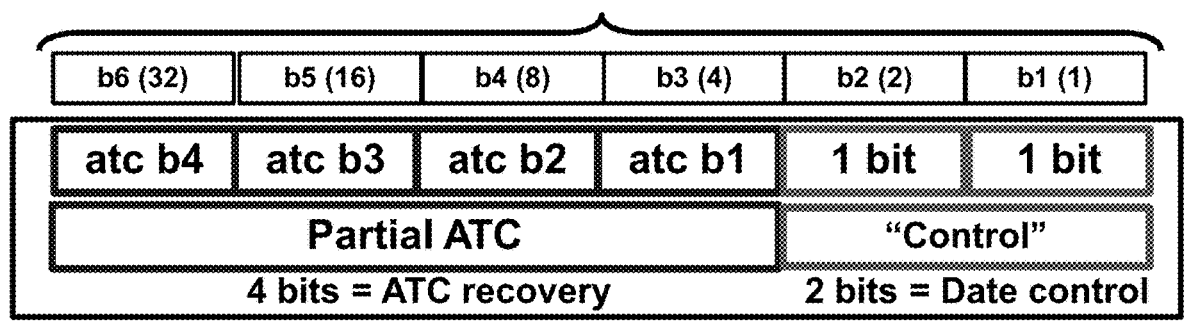
FIG. 13 illustrates an alternative strategy for date control by including control bits with ATC data.

As the skilled person will appreciate, a variety of strategies are possible in this context. It is possible to remove some of the need for iteration by carrying slightly less ATC or UN information in the dynamic fields, and by including additional data to indicate time instead. FIG. 13 shows an exemplary case, in which 2 bits of data have been repurposed to provide a date control. Here, these 2 bits can be cycled between four values such that we can validate the consistency between the validation date and the recovered date information. The control date value can be computed using a modulus 4 over the number of days between a baseline value and the day of the generation (or validation). It can be used to determine if the generation of the dynamic CVC was performed the same day as the validation of the supplied value or the previous day. The previous day can lead to adjust the reference month, when for example the generation was performed on the last day of a month and the validation is done the first day of the following month. This removes the need for month adjustment through a retry mechanism, as this will ensure that the correct month is identified using a deterministic process without retries prior to any use of the recovered data for validation of the dynamic CVC. This kind of logic is also applicable for leap years, and/or when the generation and validation is done over two years (that is generation done on the last day of a year with a validation performed on the first day of the following year).

Figure 14:
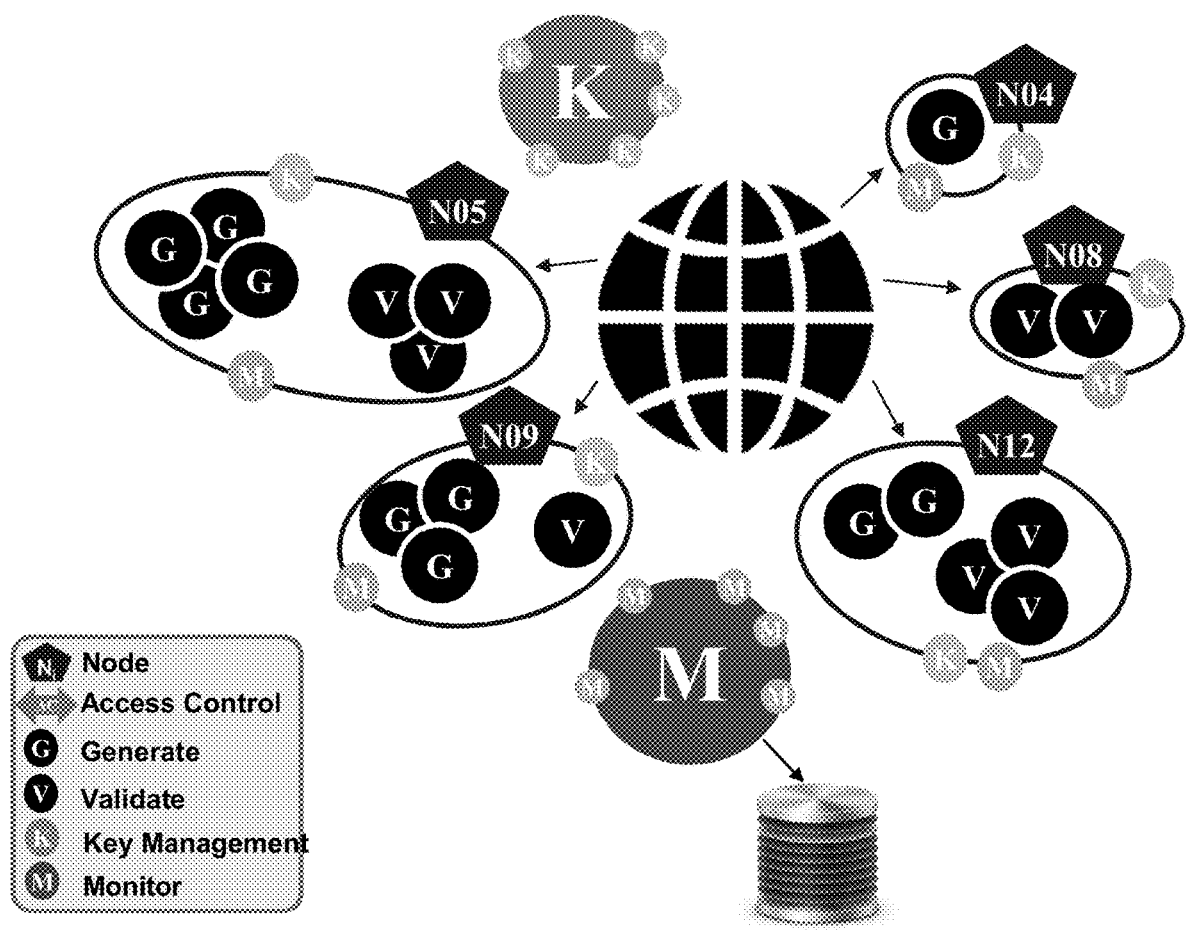
FIG. 14 illustrates schematically an arrangement for a distributed system for digital enablement of transactions.
Figure 15:
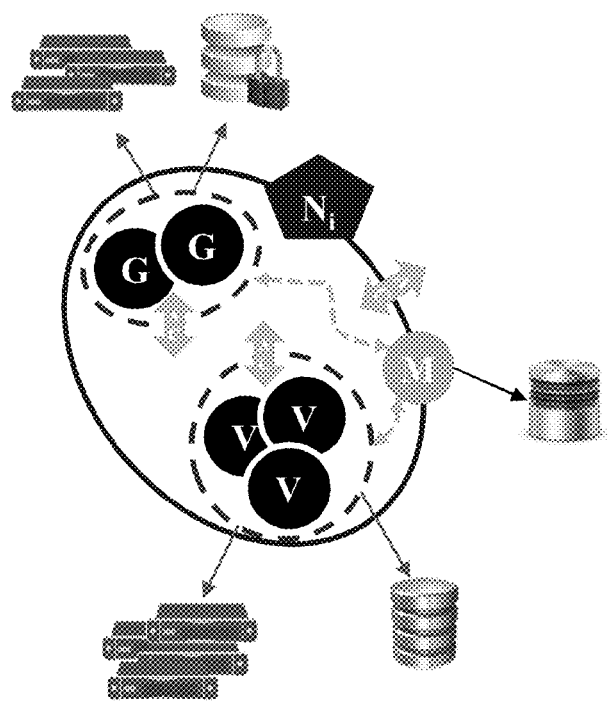
FIG. 15 illustrates a computing node of the arrangement of FIG. 14 in more detail.
Figure 16:
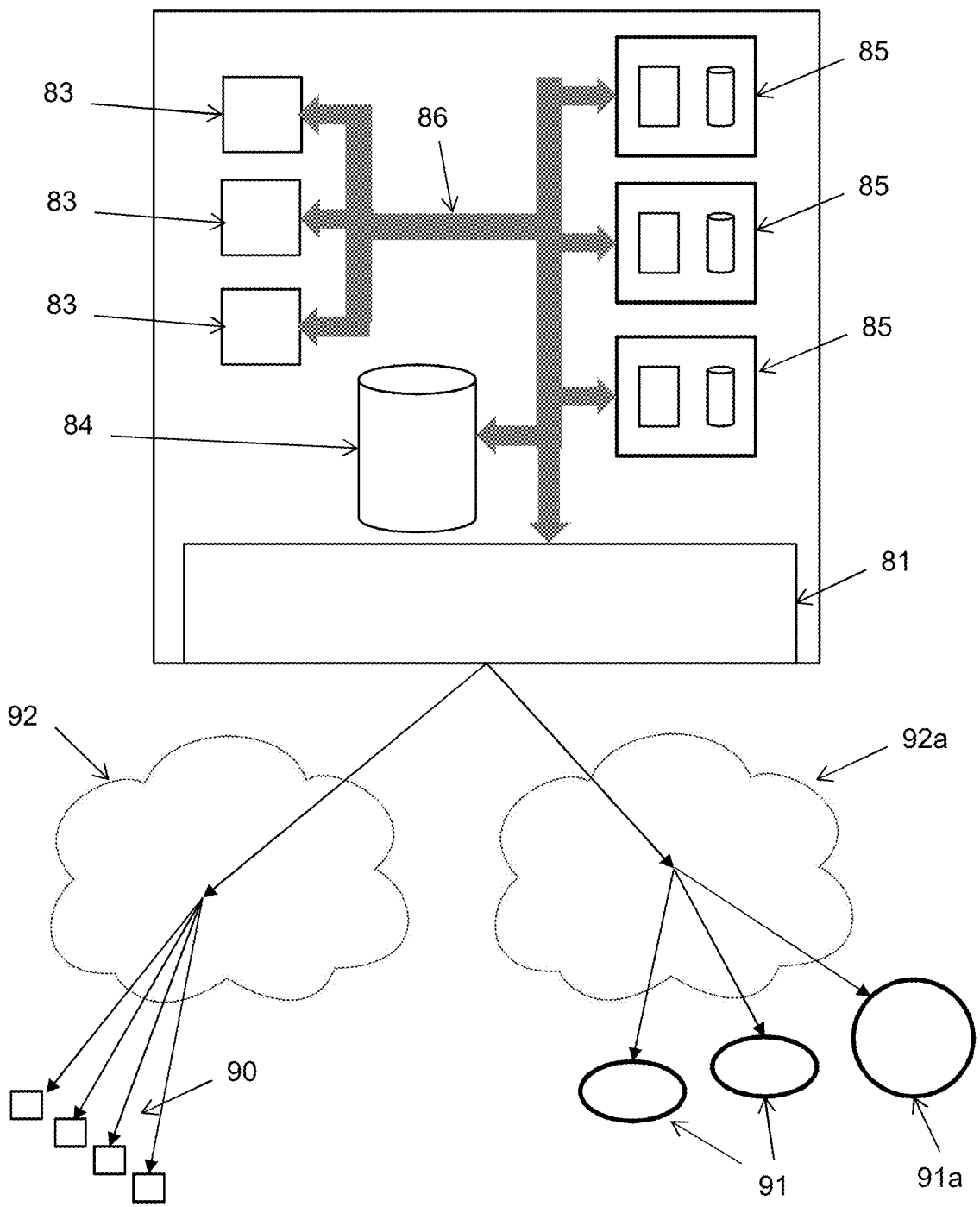
FIG. 16 illustrates elements within the computing node of FIG. 15.

A new form of decentralized architecture for digital transactions has been proposed, and this is described in the applicant's European Patent Application No. 19178583.1. Embodiments of the disclosure may also be performed on such a decentralized architecture for performing digital transactions, involving a decentralized set of nodes each capable of credential management, as is shown in FIGS. 14 to 16. These decentralized nodes may perform the function of a first computing entity 1001 (in generating a credential) or a second computing entity 1002 (in validating a credential) in a system as shown in FIG. 1, with any intervening entity with a legacy constraint (such as, for example, a merchant point of sale apparatus or server) being the third computing entity 1003.

FIG. 14 shows a decentralized system of computing nodes Nx, each capable of both generating G and validating V credentials. These credentials can be valid across the whole system (unless restricted to some nodes as result of on-soil regulation or the like), and in this case are associated with transactions for a set of users (clients) whose transactions are routed to that node, typically through geographic proximity. Nodes provide credential generation G and credential validation V as services to clients, and need to be able to generate the credentials securely and validate them securely while they are valid at least. In the architecture shown, credentials are not stored—they are generated on request and validated on the fly. As FIGS. 14 and 15 show, in addition to credential generation and validation, key management K and monitoring M can be considered as services both locally at a node and across the system, and access control AC will typically be required to allow access to a service.

Elements of a suitable computing node are shown in FIG. 16. The node 80 comprises at least one networking connection 81 to allow communication to clients 90 and other nodes 91 as well as (in this example) a central node 91*a* coordinating activities between one or several nodes. Communication is shown here as being through separate networks to each set of other parties—through a first network cloud 92 for connection to clients, and a second network cloud 92*a* for connection to other nodes within the distributed system. This reflects that these networks may be physically different, or may have different security requirements and protocols.

The node 80 contains a plurality of conventional servers 83 (which will contain their own processors and memories—not shown—along with other components as would normally be found in a server) and a memory 84 containing a central database. Also comprised within the node 80 are a plurality of hardware security modules 85 (HSMs), adapted to hold cryptographic material and to perform cryptographic functions securely. Here elements within the node 80 are shown communicating by means of a bus 86. While the node 80 in this case is represented as a single data center, this is not required—the "bus" may be, for example, comprise a dedicated network connection between a group of related data centers that allows them to provide a real-time response such that they will appear to other entities communicating with the node to be part of an integrated whole.

Existing procedures for credential management in payment systems are centralized—any request to create or validate credentials results in a query to a centralized system. For a payment system implementing EMV standards, credentials are generated using keys derived according to a hierarchical process. Issuer Master Keys (IMK) are associated with a specific range of tokens, and keys for use for credentials are derived hierarchically (Card Master Keys—CMK—from IMK, and then Session Keys—SK—from CMK). This approach is used for devices, such as physical cards, but is also used for digital transactions. The number of digital transactions is increasing extremely rapidly, as opposed to device-based interactions where the growth is more consistent with resources.

In the digital ecosystem, while there is very rapidly increasing demand, there is also generally a more secure environment, as the interaction is typically between merchant systems (or payment service providers) and the transaction system over secure pathways between well-identified participants. There are thus interactions that may require multiple cryptographic operations for security in a device context that can be streamlined when delivering services in a server context when exposing API to access the services while keeping all the assets secure in a constrained environment including key management and cryptographic operations.

While it may appear desirable to scale a transaction system for performing digital EMV transactions by using a set of distributed servers to generate and validate credentials, it is found that this approach does not scale. The overall level of key generation would not be changed, but the amount of messaging within the system would be very greatly increased, as an extremely large number of tokens would need to be managed, and replicated. Processing would be demanding and also extremely expensive, as existing EMV key generation approaches require customized rather than off-the-shelf Hardware Security Modules (HSMs), and data storage and particularly network latency would become impossible to manage problems.

At present, the device security model is also used for fully digital transactions. This security model involves Issuer Master Keys (IMKs) being stored in the transaction system HSMs and used to derive Card Master Keys (CMKs) from the relevant IMK and a card PAN (Primary Account Number). These CMKs are then stored in a device (typically a Secure Element or substitute technology). When using software-based solutions to generate transaction credentials using a mobile device, a Session Key (SK) is generated using the relevant CMK and an ATC (Application Transaction Counter) for the card/device—this is currently generated by the Credentials Management System (CMS) as shown in FIG. 4. At present, all tokens, even for fully digital transactions, are bound to this IMK/CMK/SK derivation. This also applies for transaction credentials generated by server through API exposed by the transaction system for remote payment transactions.

While the term PAN is generally used below, in the context of digitized transactions it is also appropriate to use the term TUR (Token Unique Reference) to refer to a unique identifier for a card or account. Literally, the terms should be used as follows where it is desired to distinguish one from the other:

PAN is a value associated directly with an account—this is the normal (numerical) way to identify the account—the term FPAN or Funding PAN may be used to indicate a reference to an account with an issuing bank;

TUR or "token unique reference" is a value allowing the identification of a token without exposing any PAN value, there being a mechanism within the transaction system to determine which PAN is associated with a TUR.

However, when the term PAN is used below, it should be understood that this is used in the broad sense of an identifier that may be associated with an account that identifies it—and so use of PAN below may encompass TUR.

The conventional approach requires a very heavy management load for keys, which is not appropriate for fully digital transactions. Generation of SKs, and hence Application Cryptograms (AC—a standard mechanism in EMV transactions) requires multiple cryptographic operations, not all of which can be carried out by a conventional off the shelf HSM, so bespoke HSMs are required. Massive distribution of keys across the system is required so that performance of a transaction can be supported wherever it occurs and ATC management is complex. It would be desirable to use standard HSMs, avoid massive key replication while having keys directly available for use, and to be able to provide a solution that limits the number of HSMs overall (as these typically support only a few thousand keys).

Much of this security is to provide assurance of security even if there is the possibility of compromise at a system endpoint (for example, at the cardholder device). The main purpose of the cryptographic function is to provide a guarantee—this covers both integrity of the data and authentication. The transaction related data protected by a cryptographic data includes identification of a transaction and the associated token, along with an indication of any cryptographic processes used and any relevant financial data (along with any other aspect of the transaction that needs to be guaranteed). This is represented by a transaction credential—this needs to be generated G and subsequently validated V, with these processes being monitored M to ensure overall system integrity and supported by a key management system K of some kind. In the case of a fully digital transaction, these processes take place in a constrained environment where endpoint security is not an issue in the same way as with devices. In this domain the token does not reach either of the endpoints of the conventional transaction management system—the cardholder or the issuer. Instead, it operates across a merchant system or a payment service provider (PSP) and transaction scheme provider.

This approach allows for decentralization of the credential system from a complex central server into a number of nodes providing services. These nodes will typically be geographically distributed, but may extend over a number of data centers (for example, by use of a cloud infrastructure to achieve data sharing within a node). These nodes provide services—in relation to credentials, a generation service G and a validation service V—with defined rules for access control to the services. The merchant or PSP communicates with the generation service G to obtain credentials, which are then used in a standard authorisation process, with the validating service V being called upon where necessary to validate the credential. These services have access to the computing infrastructure (HSMs, databases) of a node. Monitoring M and key management K services are also provided—these may be centrally organized or comprise a mix of coordinated and local functionality. All these services and their interrelationship are described in greater detail below.

This distributed approach may be supported by replacing the binding of a token to a specific hierarchically derived key, allowing instead the first available key from a stack of keys to be allocated to a tokenized transaction. This approach, using flexible and dynamic key management, allows for a scalable solution. Monitoring can be carried out in such a way as to ensure that the distributed architecture is secure without requiring the transmission or replication of large quantities of sensitive information. This approach can also be carried out in a standard HSM using fully FIPS compliant processes—for example, DES and 3DES need not be used. This approach is described in more detail in the applicant's European Patent Application No. 19178583.1. This describes how a limited number of keys can be allocated to a node while providing a deterministic process in order to pick a key to generate credentials. The same process can be used by a validation entity to determine the key that was used by the generator so that it can validate any cryptographic material that is part of the credentials submitted for validation.

For each node, the generation G and validation V services have access to a pool of HSMs. The HSMs contain keys that are each uniquely identified by a set of key identifiers (KeyId). KeyId may be a label, a value, an explicitly unique value such as a UUID, or anything else with appropriate properties. These KeyIds are stored in uniquely identified (Identifier) key lists—these key lists provide a list of relationships between an identifier (Id) and a stored key (KeyId). The identifiers (Id) are what will be determined by the deterministic process in order to establish what key is to be used, as will be described further below. The integrity of each key list may be guaranteed using a seal (Seal)—if the key lists are provisioned from a central location, this may be applied by a trusted party associated with that central location. Several other distribution models can be supported using for example a trusted party being a local functionality instead of a central location. A node will typically have a number of key lists available, but with only one active for generating credentials (G) at a given time—it will however generally be necessary for the validation service (V) to be able to access any key list that may be associated with a credential that is still valid. Key rotation in this approach is extremely straightforward—it may simply involve replacement of the active key list with another key list. It is however very straightforward to tell which KeyId is needed to validate a credential—it will be determined fully by the node identifier and the reference of the key list. That information is part of the credential and is used as input to the deterministic process to pick a key from a list of keys.

At any given point in time, these services G will be required to use a given key list—say Key List A in the first instance, so relevant keys must be loaded in the HSMs used by the generation services G. After the expiry of a period of time, the key rotation process may for example mandate the use of Key List B, which may require new keys which would need to be loaded in the relevant HSMs if not already present. The specific key to be used is selected from the key list by the deterministic process—this will typically give a different result after key rotation, but this is not inevitably the case. While the generation services G do not need Key List A after key rotation, the validation services V still do—they require access to any key list that relates to a potentially valid credential. The validation services V must be able to establish exactly which key was used to generate a credential by the generation services G in order to validate a credential.

The transaction related data to be protected cryptographically includes identification of the token associated with the transaction, but also identification of the transaction itself. For this, some kind of transaction identifier is required. At each node, the credential generation and validation services have access to a local database which can be used to manage such data. To ensure that transactions are managed effectively across the system, any generation of transaction credentials for a given token should be associated with a unique transaction identifier for each transaction. This may be a UUID, but as indicated previously, it is challenging to establish a UUID in a distributed system where identification of the transaction may need to be made by one of a number of distributed nodes. In embodiments of the disclosure, an appropriate identifier structure (such as a concatenation of an n bit node identifier, an e bit epoch time, and a c bit local counter) may be used.

In embodiments of the disclosure, the size of data to be carried in transaction credentials may be reduced to a few digits by use of a local transaction counter. This could simply be stored in the local database of a node and the local (rather than a global) value incremented when a local generation service G generates a new token. The Local Transaction Counter (LTC) may therefore contribute to the effectively unique identifier structure discussed above, with the combination of node identification, time and local transaction counter used to identify transactions efficiently and uniquely. Using a time-based process for key list rotation allows the LTC value to be reset at the end of a time period without loss of these properties while limiting the size of data required to carry the LTC value as part of the transaction flow.

Within the transaction data, there should be information representative of the application cryptogram generated during the transaction process. This may be a reduced form of the cryptogram—as will be described below, in "legacy" transactions where there is a very restricted data channel this may be provided as the CVC2 field (in conventional EMV transactions, CVC2 is a static field—provided as a three digit value on the rear of a physical payment card—used to confirm knowledge of the card, rather than just the PAN). This is significant as a validation service V must be able to access all the data used by a generation service G to generate a cryptogram—this will include the following:
   dynamic information carried as part of the transaction flow;
   shared information from one of the following:
      replicated processes (such as management of the key lists);
      system parameters for particular use cases.

The legacy transaction use case is of particular interest for embodiments of the disclosure. This provides a solution when the Merchant and/or the PSP are only able to manage PAN, Expiry Date and CVC2 as part of the transaction flow, and do not have access to additional data fields provided by more recent developments.

A challenge involved is in effectively identifying in a transaction how credentials have been generated in order to enable their subsequent validation—in particular, identification of which node generated the credential and which key list was used to do it, and the state of the local transaction counter. This is challenging, as transaction data is highly constrained, and to provide any of this information it will be necessary to change existing electronic transactions protocols (such as ISO 8583) or to repurpose existing fields.

For legacy electronic transactions protocols, fields that could in principle be repurposed are Primary Account Number (PAN), as some digits within the PAN may be implicit in the context of a transaction of this type and can be reused as a result, Expiry Date, where some information can be carried in a condensed format, and CVC2. Six bits could be released straightforwardly using the expiry date as a carrier, but this would not be sufficient—a node identifier would typically need at least four bits for any extended system, and one bit would probably not be sufficient for either a key list reference or a transaction counter.

Figure 17:
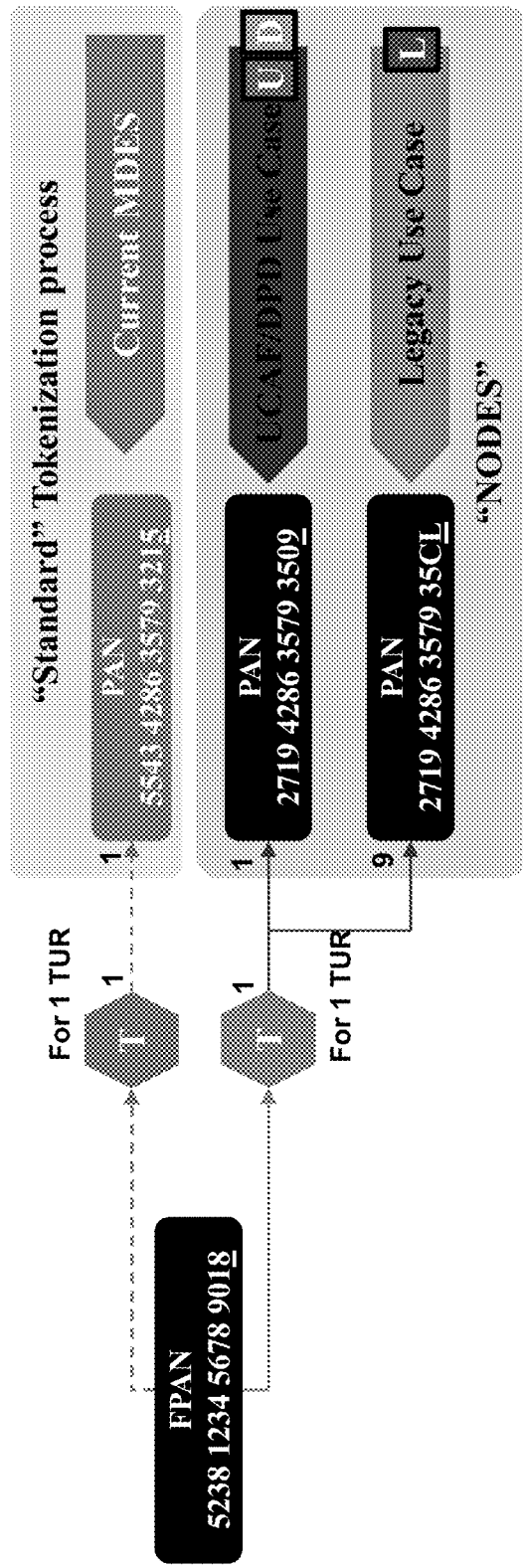
FIG. 17 illustrates an exemplary modified tokenization process for transactions using a legacy use case with the nodes of FIGS. 15 and 16.

One approach that could be used is to use a specific set of Bank Information Numbers (BINs), which form the first six digits in a PAN, to support the implementation described above—when one of these BINs is detected, special handling can be employed. This can involve associating a token with a number of PAN values. This model is shown in FIG. 17. An FPAN (Funding Primary Account Number—corresponding to a physical card account)—may be mapped to one or more tokens, but a specific token is associated with a particular technology. The top line shows a conventional tokenization process—an FPAN is associated with single token. Where the approach described above is used, the token may be associated with nine PAN values for a legacy acceptance use case (bottom line), though as will be described below, for certain new formats a one to one mapping may still be used.

Reuse of transaction fields in the legacy case can thus be as follows. For PAN, 14 digits can be used for full identification of the token, with 1 digit for the counter associated to the token for a given number, and one to the Luhn number (which needs to be retained as a checksum to ensure valid numbers are used). The 6 bits of the expiry date can be repurposed with x bits used to identify the node and y bits used to refer to the relevant key list for that node. CVC2 provides three digits which can be used for the cryptogram.

For security, it is desirable to change key lists on a regular basis to ensure system security against attacks. It is also important to be able to allow validation of credentials for a period after they have been created—a suggested approach is to allow validation of credentials for up to 24 hours after creation. If this is combined with a key rotation process that operates every 24-36 hours, this means that while the generation process will only ever have one active key list for a given node, the validation process will only need to consider two key lists (the one currently active for credential generation and the one active immediately before it). Using the established deterministic process based on the transaction counter thus establishes the key to be used. This type of binary information (i.e. one or the other) can be typically coded using one bit of information. The cryptogram plays a key role in protecting the integrity of the transaction—successful validation of a cryptogram computed over a given set of data using a correct key confirms that data originally used in credential generation is genuine. Any failure in the validation process can come from the use of wrong cryptographic material and/or corrupted transaction data.

Figure 20:
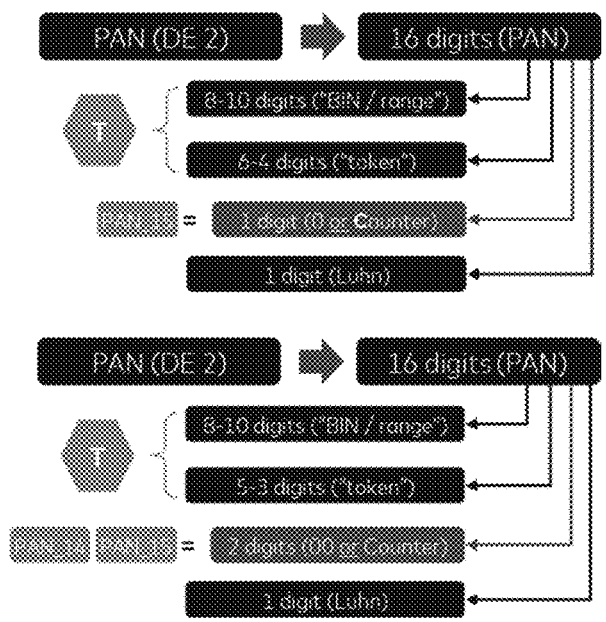
FIG. 20 illustrates an approach to carry a local transaction counter using a legacy use case suitable for use with the nodes of FIGS. 15 and 16.
Figure 21:
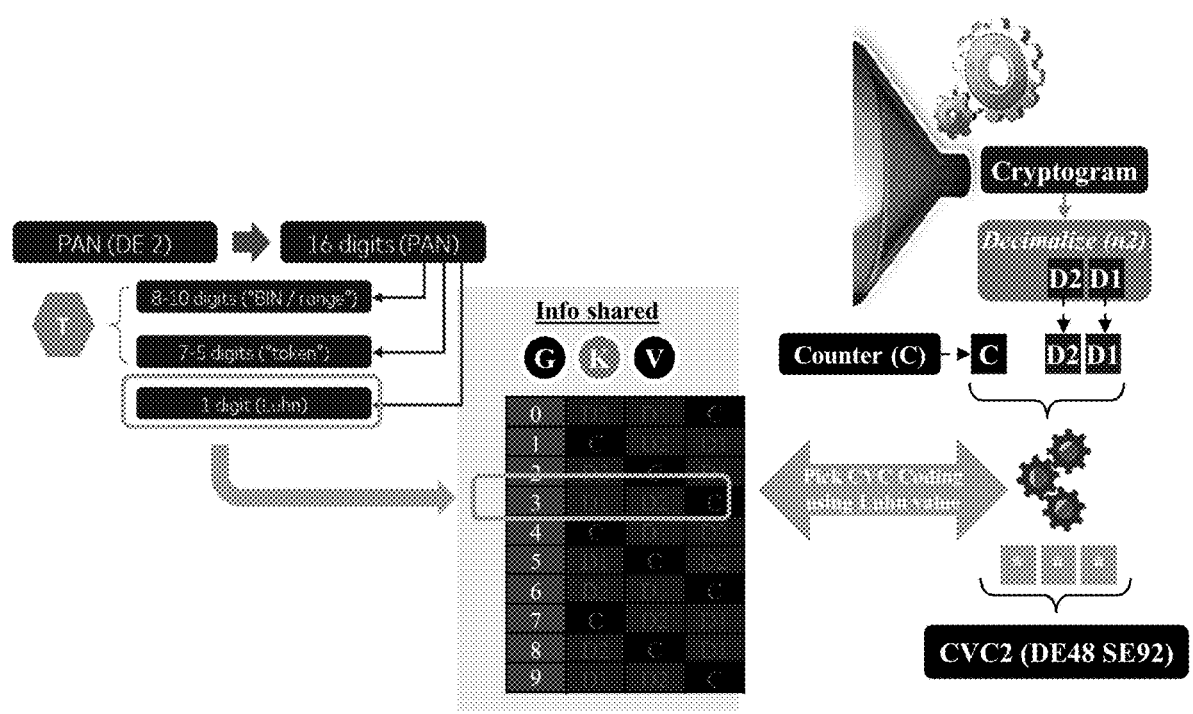
FIG. 21 illustrates using the approach of FIG. 20 in delivery of a local transaction counter using the Card Verification Code (CVC) for use with the nodes of FIGS. 15 and 16.

In each node, each generation (G) and validation (V) service has access to a local database. Any generation of transaction credentials for a given token is associated to a unique transaction identifier for each transaction. As discussed above, the local transaction counter (LTC) is managed by "G" for a given token in a given node using a given key list associated to a given use case. The same process applies at the time of validation by "V". This information can be carried in the PAN field (digit 15, or digits 14 and 15) as shown in FIG. 20 or using the CVC2 field as shown in FIG. 21 with a retry flag in the expiry date field, with a "full counter" generated if necessary if LTC is at a higher value. It is however important to set a limit on the number of cryptograms that can be generated by G and validated by V for a given token for a given node for a given key list to ensure effective access control—this value "MaxTransactionCounter" may be stored in the key list and protected by the key list seal.

Figure 18:
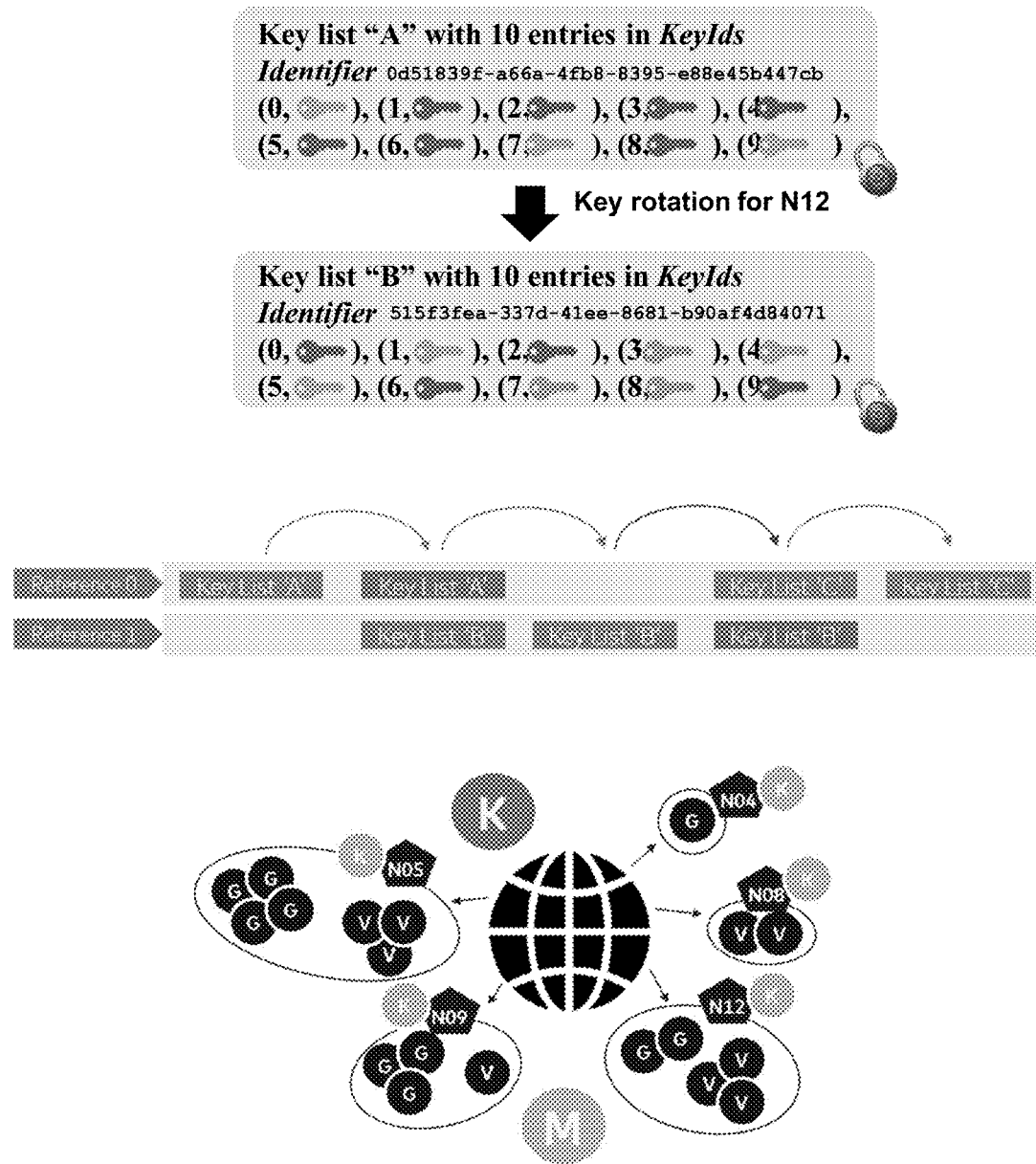
FIG. 18 illustrates a key rotation process for a system using a legacy use case.
Figure 19:
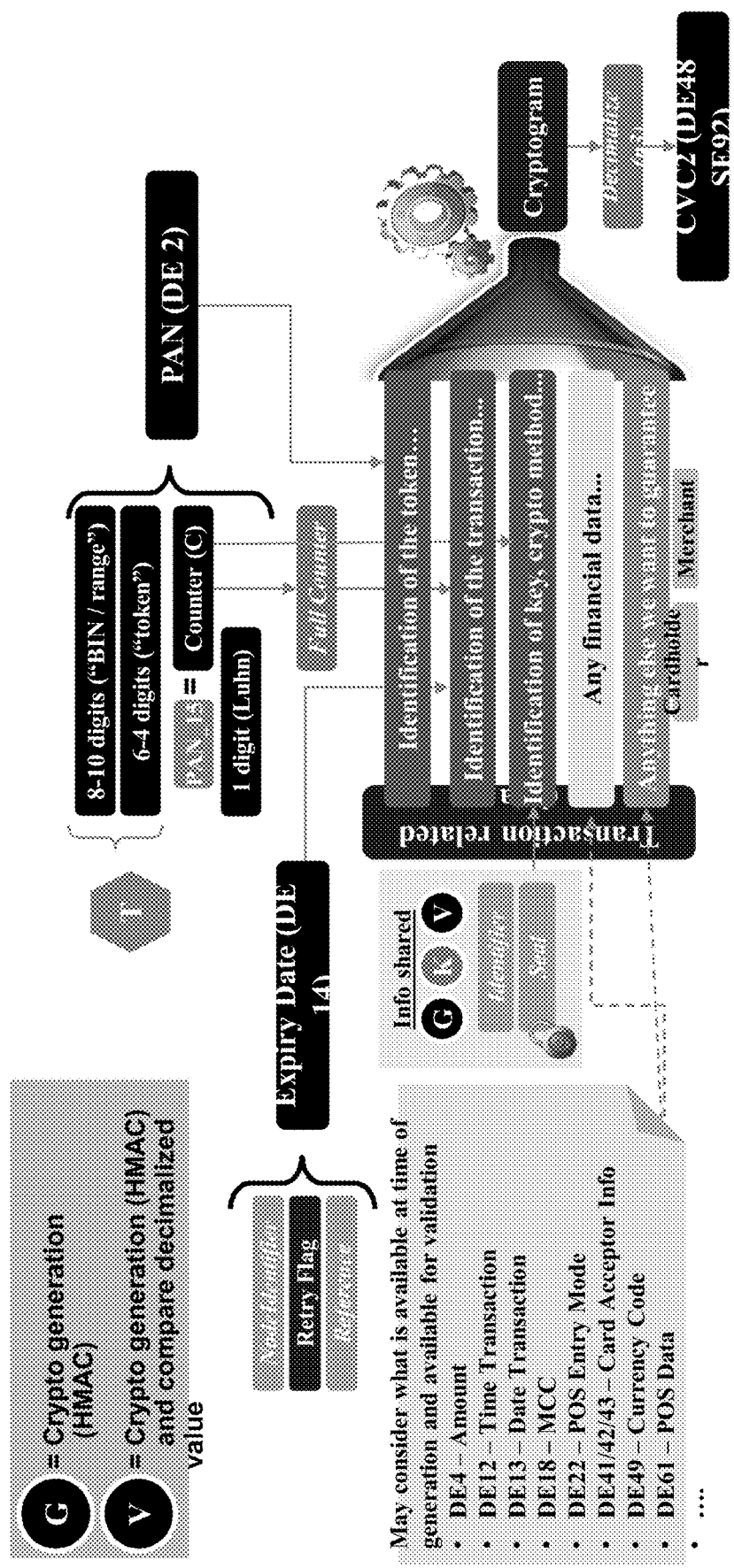
FIG. 19 illustrates an exemplary set of cryptographic mechanisms for use for digitized transactions using a legacy use case.

Cryptographic processes for this legacy case are shown in FIG. 19. In this case, HMAC is chosen as the cryptographic function as this allow the use of general purpose HSMs while delivering effective functionality. Identification of the token uses the PAN value. Identification of the transaction takes information from the expiry date (ISO 8583 field DE14)—specifically the node identifier and the reference, possibly also with a retry flag—and from the PAN field, which holds the local transaction counter. Identification of the key and the cryptographic method is provided from the local transaction counter (which establishes which key is chosen from the key list) together with information shared by the key management system in the key lists. A variety of fields defining the transaction may be used as financial data to be used to generate the cryptogram (as shown in FIG. 18), with all these fields used to generate the cryptogram, which is then decimalized and the three least significant digits used in the CVC2 field.

As the skilled person will appreciate, some variation to these protocols is possible to prioritise certain choices or priorities. For example, it may be considered desirable to find a more effective way to carry data such as the Local Transaction Counter which can avoid the use of a retry process when more data can be carried in the transaction flow—as can be seen from FIG. 20, the process shown above allows the use of at most two digits of the PAN for the transaction counter (and the use of two digits limits the number of tokens that can be provided), with a reduced cryptogram held in the three CVC2 digits. A different approach would be by using only two digits, rather than three, of the CVC2 field from the cryptogram, with the other digit used for holding the rightmost digit of the Local Transaction Counter. This could be provided in a more dynamic fashion by rearranging the three digits into a different order—this could be done by adding a CVC2 coding table to the key list, so that when the key list is used the coding table—also protected by the seal—determines the coding to be selected for providing the CVC2 field. The code may be selected by any value known by both the G and V services—for example, the Luhn number of the PAN. A new key list may then use a completely different coding table, making the process significantly dynamic.

This arrangement is shown in FIG. 21. The PAN digits identify the token and also provide a Luhn number, and the Luhn number is used to determine the ordering of digits for the CVC2 field—in this case, option 3 is chosen, indicating the least significant digit and next least significant digit of the cryptogram in the first two places, with the least significant digit of the counter in the third place. This results in a CVC2 output that can be derived by both the G and V services.

The Local Transaction Counter (LTC) in embodiments of the disclosure can be used for a number of functions. As indicated above, the LTC contributes to provision of a unique identifier for transactions. The LTC itself is not unique, but when combined with other values—for example node identifier and time period identifier as described above, but also potentially other values such as key list identifier and PAN/TUR—it many provide a unique identifier, in particular a unique identifier for a transaction performed using a given node with a given key list for a given PAN/TUR. As also described above, the LTC can also be used to provide a deterministic means to select a key from a key list for cryptogram generation and validation.

In addition to these functions, the LTC can be used in connection with tracking of various activities relating to transactions and can provide particular benefits when only limited data can be carried in transaction fields (such as the Legacy use case discussed above). In the Legacy case, as discussed above, a Dynamic Expiry Date field is used to carry additional information relating to LTC—the impact of Dynamic Expiry Date on the validation process is also discussed below.

The basic operation of the Local Transaction Counter at a generation service G and a validation service V is as follows.
Generation Service The LTC has a key role in the performance of a service and in the recordal of a service operation in the database ($db_G$) of the generation service G. This database is used to track individual LTC values for a given node ($N_i$) using a given active key list identified using keyList.Identifier. An entry is created in the database when transactions are generated for the first time for a given PAN or TUR (hereafter PAN/TUR). This entry contains one LTC value only, and is updated on any subsequent generation of transaction credentials for that PAN/TUR using that given key list in that given node.

The process of doing this is as follows. First of all, a default value of LTC is established for the first generated transaction credentials, and an entry created in the database ($db_G$) for the given PAN/TUR as indicated. For any subsequent generation of transaction credentials for that PAN/TUR, the counter will be incremented until a limit value for LTCs is reached for that PAN/TUR. This limit value may be defined in the key list (keyList.Limit.LTC). The transaction credentials generation service G will then stop generating transaction credentials for that PAN/TUR using that key list until a new key list becomes active for that node.
Validation Service The credentials validation service (V) also uses a database ($db_V$) using LTC values of credentials that have undergone validation. The database stores the list of LTC values for any given node ($N_i$) using a given—active—key list identified using keyList.Identifier. An entry will be created when transaction credentials are validated the first time for a given PAN/TUR using a given key list associated to a given node. Each entry in the database ($db_V$) is associated with a list of LTC values, a list of counters (Replay, CryptoFailure and Retry—all defaulting to 0 and incremented by an appropriate event, as described below). Any subsequent validation of transaction credentials for that PAN/TUR using a given key list associated to a given node will result in updating the database entry. On deactivation of a key list, when credentials generated using that key list can no longer be legitimately validated the part of the content of the database ($db_V$) used for the validation of transaction credentials generated by a given node ($N_i$) for that key list using keyList.Identifier will be deleted. There is a delay between the deactivation of a key list used by a generator and the deactivation of that key list for the validator(s) of generated transaction credentials. This delay is driven by business rules allowing for example up to 24 hours between the generation of transaction credentials and their effective validation.

In addition to amendment of entries when a transaction has succeeded, the crypto validation process as described further below will also update the content of the database ($db_V$) for additional purposes: detection and tracking of replays; tracking of crypto failures; and tracking the number of retries. These are described further in the applicant's European Patent Application No. 19208139.6.

The validation process will now be described in more detail with particular attention to LTC management issues. In this context, the validation process covers the following:
    Service request management
    Gather and process transaction related data, including:
        Identification of the Token (PAN/TUR)
        Identification of the transaction (using LTC)
        Identification of the key list (using node information and the key list's identifier)
        Identification of the transaction key and crypto function Processing of any financial or other data
Validation of the cryptogram
Validation of the transaction credentials
Process common to any use case (L, U, D1 and D2)
Specific process for the selected use case (L, U, D1 or D2)
Reporting to local monitoring (mV)

As indicated above, the focus of this document is on LTC use only, so other aspects of the validation process are not described in detail here.

Special considerations for LTC management for the legacy use case will now be discussed. The legacy use case (L) is significantly more complex because of the problems caused by the limited availability of space to capture LTC and other data, as it is indicated above with reference to FIGS. 18 to 21. As noted, the legacy use case (L) has severe size restrictions on the data that can be carried as part of transaction data, and only a part of the LTC value can be carried—typically one digit (C). This means that a recovery process has to be employed to recover LTC data effectively and reliably. Validation processes are described further in European Patent Application No. 19208139.6. as mentioned above.

As noted, the Legacy (L) use case is complicated by the lack of space available to carry LTC data in a transaction. A particular issue is that of the use of Dynamic Expiry Date and its consequences, particularly the difficulty of managing the end of the month where certain fields that can be effectively repurposed at other times become significant.

The following discussion relates to the use of a "Dynamic Expiry Date" to carry information in the legacy (L) use case. The expiry date field is used to carry a 6-bit value (exp) by adding exp months to a next month value (YYMM) computed using $t_x$ (UTC) as the reference.

| b6 | b5 | b4 | b3 | b2 | b1 | Description |
|---|---|---|---|---|---|---|
| x | | | | | | Key List Reference |
| | x | | | | | Retry Flag |
| | | x | x | x | x | Node Identifier |

A worked example is as follows

| Key List Reference | 0 (0b) | 010011b = |
| Retry Flag | 1 (1b) | 19 |
| Node Identifier | 3 (0011b) | |

$t_X$ (10:30:00 AM CST, Wednesday, 26 Jun. 2019)=03:30:00 PM UTC, Wednesday, 26 Jun. 2019

Next month (YYMM) based on $t_X$ (UTC)=1907

Dynamic Expiry date=1907 "+" 19=2102

The dynamic expiry date is computed by G as part of the generation of transaction credentials for the "L" use case—it is used here because PAN, Expiry Date and CVC2 is the minimal set of data that can handled by a merchant/PSP and their acquirer, so some mechanism is required to carry additional necessary information.

In most cases, a simple deterministic process can be used to extract information reliably. G knows time $t_G$ corresponding to the generation of transaction credentials.

Time $t_G$ can be converted to the UTC time zone, which can be used as a reference for the whole system This converted value can univocally determine the value of "next month"

The dynamic expiry date is the combination of "next month" with a value corresponding to the 6 bits of information as described above.

In short, for a given transaction credentials generation we can have one value for the dynamic expiry date established using a deterministic process. The validation service V follows the same logic but using as a reference time $t_V$ corresponding to the validation of transaction credentials.

Complexity is caused by the possibility of a significant time lag between the generation and validation of credentials in practical systems. A normal business rule might be for validation of transaction credentials to occur up to 24 hours after their generation.

There are two cases in which this can be problematic. One is where $t_G$ is close to the end of month, so $t_G$ and $t_V$ may not have the same value for "next month", leading V to recover invalid values when decoding the dynamic expiry date. This can impact the identification of the node, the reference of the key list and/or the value of the retry flag.

Another edge case is having a validation time prior to the generation time. We expect G and V in the same node or across nodes to use a reliable source of information for time minimizing that risk.

This can lead to:
1. Failure in the validation process with a need to retry using another expiry date with an adjusted value for "next month"
2. False approval of invalid transactions in the legacy case where we need 2 (or 3) digits to match to consider there to have been a successful cryptogram validation. This can impact later valid transactions, as they may be wrongly reported as replay.

Both cases are a technical challenge as the validation process uses counters and performs updates of the content of the database based on LTC value (e.g. LTC tracking). Using wrong information for the decision process at time of validation of transaction credentials could corrupt the processing of transactions.

Monitoring can be also impacted, with false reporting of system misuse while the root cause was only that transaction credentials had been generated on the last day of the month and validated the following day.

FIG. 22 provides some examples of generation of transaction credentials at the end of the month with validation the same day or on the first of the following month. Examples are also provided for generation done on the first day of the month with validation done the same day or the following day.

One possibility to address this could be to use retry to address the problem. This is possible if monitoring can be relied upon to contain any false approval issues. The current $t_V$ could be used to perform validation processes keeping track of any database changes, with commitment to the changes (with expiryDate=STANDARD) being dependent on successful crypto validation. If this fails, an alternative dynamic expiry date is tried and appropriate changes made, which are committed to (with expiryDate=SPECIAL) on successful crypto validation. The embodiment described in more detail below to address this problem uses a different approach, however.

FIG. 23 shows a list of values indicating the impact of a delta between the value defined by G at time $t_G$ and carried using a dynamic expiry date and the value retrieved by V at time $t_V$ using a "next month" value that is shifted (i.e. one additional month) compared to what was actually used by G.

When analyzing the information on the right (sorted using the node identifier retrieved by V), we can identify a pattern: a node No as seen by V was $N_1$ for G ($N_0 \leftrightarrow N_1$) and so on with $N_i \leftrightarrow N_{i+1}$, with the exception of $N_{15} \leftrightarrow N_0$.

This information indicates that another possible way to address this problem may be by temporarily blacklisting of certain nodes—on the first day of the month validation nodes adapted to validate transactions from generation service nodes with an odd number i ($N_i$) could reject validation requests relating to generation services from even numbered nodes, and so on. It would be most effective if this was handled at the routing level. Again, the solution discussed in detail below uses a different approach.

However, on further review it can be seen that the key list reference (KR) is not impacted by the end of month challenge with the exception of node 0. This is as shown in FIG. 24.

A key list needs to have a limited lifetime. This is particularly necessary for the legacy use case as there is counter information that can only be carried using one digit. This does mean that some rotation of the key list (and its associated key list reference) must happen in order to reset the LTC.

A full solution on this basis is described below with reference to FIG. 25. FIG. 25 describes a solution involving rotation of key lists around the end of the month. It also shows that validation of transaction credentials can be done up to 24 hours after their generation.

When rotating a key list, another key list reference (KR) will be assigned to the key list.

When using the legacy use case, this can be seen as a flip between value 0 and value 1. If we consider that an effective life time of a key list is set to 24 hours with an activation done at 12:00:00 AM (UTC time) and a deactivation done at 11:59:59 PM (UTC time), the flip of the key list reference value can be used by the validation process to determine if the generation of the transaction credentials was done the same day or the day before.

When validation of transaction credentials is performed for example on the first day of the month:
V is aware of the value of the active key list reference used by G on that day (let's say KR=0 in the example above).
V knows that the key list (with KR=1) that was used the previous day had been deactivated at midnight at level of G.
According to business rules, it is still possible for V to validate transaction credentials generated using the key list (with KR=1) up to 24 hours after their effective generation by G.

If we consider that all the nodes enabled for legacy use case follow the same rule for deactivation at midnight with the associated flip of the key list reference, it is possible for V to determine if there is a need to adjust the time used for recovery of the information carried using the dynamic expiry date:
Any recovered key list reference that is equal to the current and active key list reference of generating nodes means that generation was done the same day as the ongoing validation.
Any difference between active key list reference and key list reference found in transaction data means that the generation was done the day before compared to the ongoing validation.
If validation is done the first day of the month:
Adjust the "next month" value to recover the accurate information from key list (including node information and retry flag).
Use SetValidationOutcome(expiryDate=SPECIAL) instead of SetValidationOutcome (expiryDate=STANDARD)

Node 0 would require a bespoke process as the recovered key list reference may be corrupted following the use of a wrong "next month" value. In order to avoid any such complex process it may in practice be simplest to exclude the use of node 0 when using the legacy use case.

As the skilled person will appreciate, the embodiments described above are exemplary, and further embodiments falling within the spirit and scope of the disclosure may be developed by the skilled person working from the principles and examples set out above.

The invention claimed is:

1. A method comprising:
obtaining one or more elements of information relating to an event involving a payment card;
determining a cryptographic record of the event using the one or more elements of information;
combining at least one of the one or more elements with time information associated with a recordal of the event to generate a dynamic expiration date for the payment card; and
communicating a message including the cryptographic record and the dynamic expiration date to a validator, wherein the validator is configured to recover the one or more elements using the dynamic expiration date from the message and to validate that the one or more elements are correctly recovered by recalculating the cryptographic record from the one or more recovered elements and comparing the recalculated cryptographic record with the cryptographic record from the message.

2. The method of claim 1, wherein the event is a service instance.

3. The method of claim 2, wherein the service instance comprises generation of a transaction record or transaction credentials.

4. The method of claim 1, wherein the one or more elements comprise a transaction counter.

5. The method of claim 1, wherein the one or more elements comprise an unpredictable number.

6. The method of claim 1, wherein the one or more elements comprise a key identifier.

7. The method of claim 6, wherein a change in the key identifier is synchronised with a change in the time information.

8. The method of claim 6, wherein a key identified by the key identifier is used in the recalculating of the cryptographic record.

9. The method of claim 1, wherein the message further comprises one or more check bits for identification of the time information.

10. A method comprising:
receiving a message relating to an event involving a payment card, wherein the message includes a cryptographic record and a dynamic expiration date associated with the payment card;
determining one or more elements of information relating to the event that had been combined with time information to generate the dynamic expiration date;
computing cryptographic record data from the one or more elements of information relating to the event;
comparing the computed cryptographic record data with the cryptographic record from the message; and
determining whether the one or more elements of information relating to the event are correct based on the comparison.

11. The method of claim 10, wherein determining the one or more elements of information relating to the event comprises determining whole elements of information relating to the event from any partial elements of information relating to the event.

12. The method of claim 10, wherein the event comprises generation of a transaction record or transaction credentials.

13. The method of claim 10, wherein the one or more elements of information comprise a transaction counter.

14. The method of claim 10, wherein the one or more elements of information comprise an unpredictable number.

15. The method of claim 10, wherein the one or more elements of information comprise a key identifier.

16. The method of claim 15, wherein a change in the key identifier is synchronised with a change in the time information.

17. The method of claim 15, wherein a key identified by the key identifier is used in the computing of the cryptographic record data.

18. The method of claim 10, wherein determining whether the one or more elements of information relating to the event are correct based on the comparison comprises:
   if the computed cryptographic record data and the cryptographic record from the message do not match, varying the time information; and
   using the varied time information to redetermine the one or more elements of information relating to the event that had been combined with the time information to generate the dynamic expiration date.

19. The method of claim 10, wherein determining whether the one or more elements of information relating to the event are correct based on the comparison comprises:
   if the computed cryptographic record data and the cryptographic record from the message do not match, varying at least one of the one or more elements of information; and
   recomputing and comparing the cryptographic record data corresponding to a predetermined plan based on the at least one varied element of information until there is a successful match between the recomputed cryptographic record data and the cryptographic record from the message.

20. The method of claim 10, wherein the message further comprises one or more check bits for identification of the time information, and wherein the one or more check bits are used to provide correct time information before determining the one or more elements of information relating to the event.

21. A computing node comprising:
   one or more processors; and
   at least one memory comprising program instructions which, when executed by the one or more processors, cause the one or more processors to:
      obtain one or more elements of information relating to an event involving a payment card;
      determine a cryptographic record of the event using the one or more elements of information;
      combine at least one of the one or more elements with time information associated with a recordal of the event to generate a dynamic expiration date for the payment card; and
      communicate a message including the cryptographic record and the dynamic expiration date to a validator, wherein the validator is configured to recover the one or more elements using the dynamic expiration date from the message and to validate that the one or more elements are correctly recovered by recalculating the cryptographic record from the one or more recovered elements and comparing the recalculated cryptographic record with the cryptographic record from the message.

\* \* \* \* \*